US010391532B2

(12) United States Patent
Chin et al.

(10) Patent No.: US 10,391,532 B2
(45) Date of Patent: Aug. 27, 2019

(54) SYSTEM AND METHOD FOR TREATMENT OF CONTAMINATED SEDIMENTS OR SOILS USING FREE RADICAL CHEMICAL REACTION AND PHASE SEPARATION PROCESSES

(71) Applicant: SedTech Innovations LLC, Houston, TX (US)

(72) Inventors: Arthur E. Chin, Plymouth, MA (US); David M. Bates, Houston, TX (US)

(73) Assignee: SedTech Innovations LLC, Houston, TX (US)

( * ) Notice: Subject to any disclaimer, the term of this patent is extended or adjusted under 35 U.S.C. 154(b) by 231 days.

(21) Appl. No.: 15/278,870

(22) Filed: Sep. 28, 2016

(65) Prior Publication Data

US 2017/0087609 A1    Mar. 30, 2017

Related U.S. Application Data

(60) Provisional application No. 62/234,999, filed on Sep. 30, 2015.

(51) Int. Cl.
*B01D 17/02* (2006.01)
*B01D 17/12* (2006.01)
(Continued)

(52) U.S. Cl.
CPC ............ *B09C 1/08* (2013.01); *B01D 17/0217* (2013.01); *B01D 17/12* (2013.01); *B01D 21/302* (2013.01);
(Continued)

(58) Field of Classification Search
CPC .. B01D 17/0217; B01D 17/12; B01D 21/262; B01D 21/267; B01D 21/302;
(Continued)

(56) References Cited

U.S. PATENT DOCUMENTS 5,286,140 A    2/1994  Mather
5,376,182 A    12/1994 Everett et al.
(Continued)

OTHER PUBLICATIONS

Chen et al., *Effects of chemical oxidation on sorption and desorption of PAHs in typical Chinese soils*, Environ. Pollut. 157 (2009), 1894-1903.
(Continued)

*Primary Examiner* — Lucas A Stelling
(74) *Attorney, Agent, or Firm* — Foley & Lardner LLP

(57) ABSTRACT

A system for treatment of contaminated sediments and soils using free radical chemical reaction and phase separation processes comprises a sediment or soil inlet system, a slurry tank, wherein the inlet system feeds the slurry tank, a water make-up tank, an optional acid storage tank, wherein the water make-up tank and the acid storage tank are connected to the slurry tank, a reaction vessel, wherein the slurry tank is connected to the reaction vessel, an oxidant agent storage tank, an optional catalyst storage tank, wherein the oxidant agent storage tank and the catalyst storage tank are connected to the reaction vessel, a first particle separator, wherein the reaction vessel is connected to the first particle separator, and an oil/water separator, wherein the first particle separator is connected to the oil/water separator is disclosed. A method for treatment of contaminated sediments and soils is also disclosed.

54 Claims, 13 Drawing Sheets

(51) Int. Cl.
| | | |
|---|---|---|
| *B01D 21/26* | (2006.01) | |
| *B01D 21/30* | (2006.01) | |
| *B01D 33/03* | (2006.01) | |
| *B04B 1/12* | (2006.01) | |
| *B04B 5/10* | (2006.01) | |
| *B04C 5/26* | (2006.01) | |
| *B04C 5/28* | (2006.01) | |
| *B04C 5/30* | (2006.01) | |
| *B09C 1/02* | (2006.01) | |
| *B09C 1/08* | (2006.01) | |

(52) U.S. Cl.
CPC ............... *B01D 33/03* (2013.01); *B04B 1/12* (2013.01); *B04B 5/10* (2013.01); *B04C 5/26* (2013.01); *B04C 5/28* (2013.01); *B04C 5/30* (2013.01); *B09C 1/02* (2013.01); *B01D 21/262* (2013.01); *B01D 21/267* (2013.01)

(58) Field of Classification Search
CPC .. B01D 33/03; B04B 1/12; B04B 5/10; B04C 5/26; B04C 5/28; B04C 5/30; B09C 1/02; B09C 1/08; C02F 2305/02; C02F 2305/023; C02F 2305/026
See application file for complete search history.

(56) References Cited

U.S. PATENT DOCUMENTS

| | | | | |
|---|---|---|---|---|
| 5,797,701 | A * | 8/1998 | Conaway | B09C 1/08 210/199 |
| 6,082,548 | A | 7/2000 | Stephenson et al. | |
| 6,346,412 | B1 | 2/2002 | Stormo | |
| 2002/0003115 | A1 | 1/2002 | Conaway et al. | |
| 2002/0006658 | A1* | 1/2002 | Horn | B09C 1/08 435/262.5 |
| 2002/0143226 | A1 | 10/2002 | Saha et al. | |
| 2003/0136747 | A1 | 7/2003 | Wood et al. | |
| 2003/0230009 | A1 | 12/2003 | Chesner et al. | |
| 2004/0129646 | A1* | 7/2004 | Conaway | B09C 1/02 210/759 |
| 2004/0134857 | A1 | 7/2004 | Huling et al. | |
| 2006/0283805 | A1 | 12/2006 | Schreppel, Jr. | |
| 2008/0272063 | A1 | 11/2008 | Boulos et al. | |
| 2011/0068063 | A1* | 3/2011 | Mallonee | B09C 1/02 210/770 |
| 2013/0269735 | A1* | 10/2013 | Roetzel | E21B 21/066 134/40 |

OTHER PUBLICATIONS

Choi et al., *KIOST Study: Destruction of PCBs from contaminated marine sediments by washing with surfactants and Fenton reagent*, KIOST, Ansan 426-744, South Korea (Battelle—Eighth International Conference on Remediation and Management of Contaminated Sediments, New Orleans, LA, Jan. 12-15, 2015).
Corbin et al., *Reactive oxygen species responsible for the enhanced desorption of Dodecane in modified Fenton's systems*, Water Environ. Res. 79(1) (Jan. 2007), 37-42.
Furman et al., *Enhanced reactivity of superoxide in water—solid matrices*, Environ. Sci. Technol. 43(5) (2009), 1528-33.
Gabriel et al., *Degradation of polycyclic aromatic hydrocarbons by the Copper(II)-Hydrogen Peroxide system*, Folia Microbiol. 45(6) (2000), 573-75.
Kim, KIOST Study: *A new on-site approach for the remediation of contaminated marine sediments in Korea*, KIOST, 717 Haeanro, Ansan, 426-744, The Republic of Korea (Battelle—Eighth International Conference on Remediation and Management of Contaminated Sediments, New Orleans, LA, Jan. 12-15, 2015).
Lundstedt et al., *Transformation of PAHs during ethanol-Fenton treatment of an aged gasworks' soil*, Chemosphere 65 (2006), 1288-94.
Martens et al., *Enhanced degradation of polycyclic aromatic hydrocarbons in soil treated with an advanced oxidative process—Fenton's reagent*, J. Soil Contam. 4(2) (1995), 175-90.
Ndjou'Ou et al., *Surfactant production accompanying the modified Fenton oxidation of hydrocarbons in soil*, Chemosphere 65 (2006), 1610-15.
Petri, B.G. et al., Chapter 2: Fundamentals of ISCO Using Hydrogen Peroxide. *In Situ Chemical Oxidation for Groundwater Remediation*, Eds. R.L. Siegrist et al., Springer Science+Business Media, LLC (2011) 33-88.
Quan et al., *Effect of contaminant hydrophobicity on hydrogen peroxide dosage requirements in the Fenton-like treatment of soils*, J. Hazard. Mater. B102 (2003), 277-89.
Quiroga et al., *Chemical degradation of PCB in the contaminated soils slurry: Direct Fenton oxidation and desorption combined with the photo-Fenton process*, J. Environ. Sci. Health, Part A, 44(11) (2009), 1120-26.
Reddy et al., *Fenton-like oxidation of polycyclic aromatic hydrocarbons in soils using electrokinetics*, J. Geotech. Geoenviron. Eng. (ASCE, Oct. 2009), 1429-39.
Smith et al., *Identification of the reactive oxygen species responsible for carbon tetrachloride degradation in modified Fenton's systems*, Environ. Sci. Technol. 38(20) (2004), 5465-69.
Smith et al., *Mechanism for the destruction of carbon tetrachloride and chloroform DNAPLs by modified Fenton's reagent*, J. Contam. Hydrol. 85 (2006), 229-46.
Tipson, *Oxidation of polycyclic, aromatic hydrocarbons: A review of the literature*, U.S. Dept. of Commerce, NBS Monograph 87, Washington, D.C. (1965).
Ukiwe et al., *Polycyclic aromatic hydrocarbons degradation techniques: A review*, Int'l J. Chemistry 5(4) (2013), 43-55.
USEPA Contaminated Sediment Remediation Guidance for Hazardous Waste Sites, EPA-540-R-05-012, OSWER 9355.0-85 (Dec. 2005) (available at http://www.epa.gov/superfund/resources/sediment/guidance.htm).
Watts et al., *Effect of contaminant hydrophobicity in the treatment of contaminated soils by catalyzed H2O2 propagations (modified Fenton's reagent)*, J. Adv. Oxid. Technol. 11(2) (Jan. 2008), 354-61.
Watts et al., *Role of reductants in the enhanced desorption and transformation of chloroaliphatic compounds by modified Fenton's reactions*, Environ. Sci. Technol. 33(19) (1999), 3432-37.
Watts et al., SERDP Final Report: *Improved understanding of Fenton-like reactions for the in situ remediation of contaminated groundwater including treatment of sorbed contaminants and destruction of DNAPLs*, Project No. CU-1288, Washington State University (Apr. 29, 2006).
Dec. 20, 2016 International Search Report and Written Opinion mailed in International Patent Application No. PCT/US16/54439, filed Sep. 29, 2016.

\* cited by examiner

SYSTEM AND METHOD FOR TREATMENT OF CONTAMINATED SEDIMENTS OR SOILS USING FREE RADICAL CHEMICAL REACTION AND PHASE SEPARATION PROCESSES

PRIOR RELATED APPLICATIONS

This application claims the benefit of U.S. Provisional Patent Application No. 62/234,999 entitled "System and Method for Treatment of Contaminated Sediments or Soils Using Free Radical Chemical Reaction and Phase Separation Processes," filed on Sep. 30, 2015.

FEDERALLY SPONSORED RESEARCH STATEMENT

Not Applicable (N/A)

REFERENCE TO MICROFICHE APPENDIX

N/A

FIELD OF INVENTION

This invention relates generally to a system and method for remediation of contaminated sediment or soils, and, particularly, to remediation and treatment of contaminated sediments in streams, rivers, and harbors, or upland soils using a treatment train that is continuous or semi-continuous in nature and that exploits innovative free radical chemical reaction and phase separation processes.

BACKGROUND OF THE INVENTION

Over a century of industrial development and operations has created a legacy of significant contamination in adjoining water bodies and underlying sediments of historic industrial sites. Sediment remediation presents unique challenges compared with remediation of upland (onshore) sites. Remediation technologies developed for upland sites have been found to have limited applicability to contaminated sediment sites, primarily due to the aqueous environment in which the contaminated sediments are found. More importantly, the volumes of contaminated media present at sediment sites requiring remediation can be orders of magnitude greater than that which exists at contaminated upland sites resulting in extensive cleanup time and costs due to technological limitations. The United States Environmental Protection Agency (EPA) has identified many sediment and upland sites impacted by organic hydrocarbons, polycyclic chlorinated biphenyls, dioxins, and other environmental contaminants that require remediation.

Current methods of sediment remediation typically require that sediments first be dredged and then transported to facilities for dewatering, after which they must be hauled to a regulated waste disposal facility. Due to the volumes of sediments requiring dredging, dewatering and disposal at the larger sites, cleanup times for such sites using existing technologies have extended to ten years or greater with associated costs in the hundreds of millions to over a billion dollars. Local internment leaves the contaminants in place and is being considered as a cost savings alternative to disposal at regulated waste disposal facilities. However, there is often insufficient space within the area under remediation to construct such a unit and public opinion on such local internment sites is generally highly negative.

Similarly, the remediation of contaminated upland sites generally occurs through the excavation of the impacted soils. It situ and ex situ technologies have been applied to remove and/or degrade the contaminants on the soil, however with limited success and at times prohibitive costs. Therefore, disposal of these excavated soils at a regulated waste disposal facility is still a common practice.

Thus, a method for desorption of contaminates and treatment of contaminated sediments and soils that a) is continuous or semi-continuous in nature, b) has a high throughput capacity, c) is cost effective, and d) incorporates attributes of "green" and sustainable technologies would revolutionize the remediation field.

SUMMARY OF THE INVENTION

This invention relates generally to a system and method for remediation of contaminated sediment or soils, and, particularly, to remediation and treatment of contaminated sediments in streams, rivers, and harbors, or soils, using an integrated free radical chemical reaction and phase separation processes.

This invention includes three principal processes: (1) desorption of organic contaminants from the sediment or soil particles (i.e., solid fraction) by free radical chemical reactions, (2) degradation of organic contaminants by the free radical chemical reactions, and (3) separation of the solid, aqueous and organic fractions resulting from the free radical chemical reactions. These three processes may occur in a sequential, and continuous or semi-continuous fashion in a single component or a plurality of components connected in parallel to increase throughput or in series to increase efficiency. In an embodiment, the invention can be deployed (1) at the location of sediment dredging and re-deployed as the dredge site is relocated within the water body, or (2) at a designated treatment area for either dredged sediments or excavated soils. Due to the semi-mobile or mobile nature of the invention, impacted sediments dredged from the water body can be staged and processed at the actual dredge site, eliminating the need for its transport via barging or pumping to more distal sites for treatment.

In an embodiment, a system for desorption of contaminates and treatment of contaminated sediments and soils using free radical chemical reaction and phase separation processes comprises a sediment or soil inlet system. In an embodiment, the sediment and/or soil inlet system comprises: a screener comprising: a screen inlet; a shaker, wherein the shaker shakes the screen inlet; a first outlet of the screener; and a second outlet of the screener, wherein the first outlet of the screener feeds into the inlet of the slurry tank and wherein the second outlet of the screener is a coarse debris outlet.

In an embodiment, the sediment or soil inlet system comprises: a hydraulic dredge, wherein an outlet to the hydraulic dredge is connected to the screen inlet of the screener or an inlet of a slurry tank.

In an embodiment, the sediment and/or soil inlet system comprises: a mechanical dredge; and a conveyor, wherein an outlet of the mechanical dredge supplies an inlet of the conveyor and wherein an outlet of the conveyor feeds into the screen inlet of the screener or the inlet of the slurry tank.

In an embodiment, the sediment or soil inlet system comprises: an excavator; and a screener comprising: a screen inlet, a first outlet of the screener; and a second outlet of the screener, wherein an outlet of the excavator feeds into the screen inlet of the screener, wherein the first outlet of the screener feeds into the inlet of a slurry tank and wherein the second outlet of the screener is a coarse debris outlet; and a shaker, wherein the shaker shakes the screen inlet.

In an embodiment, the system comprises a slurry tank, wherein an outlet of the sediment or soil inlet system feeds into an inlet of the slurry tank or a screen inlet of an optional screener. If the screener is present, a first outlet of the screener feeds into the inlet of the slurry tank.

In an embodiment, the system comprises a water make-up tank, wherein an outlet of the water make-up tank is connected to the inlet of the slurry tank.

In an embodiment, the system comprises an acid/base storage tank comprising an acid or a base, wherein an outlet of the acid/base storage tank is connected to the inlet of the slurry tank. In an embodiment, the acid is selected from the group consisting of carboxylic acids, mineral acids, organic acids, and combinations thereof or wherein the base is selected from the group consisting of mineral bases, organic bases, and combinations thereof.

In an embodiment, the system comprises a reaction vessel, wherein the outlet of the slurry tank is connected to an inlet of the first reaction vessel.

In an embodiment, the system comprises an oxidant agent storage tank comprising an oxidant agent, wherein an outlet of the oxidant agent storage tank is connected to the inlet of the slurry tank. In an embodiment, the oxidant agent is selected from the group consisting of hydrogen peroxide, sodium persulfate, and combinations thereof.

In an embodiment, the system comprises a catalyst storage tank comprising a catalyst, wherein an outlet of the catalyst storage tank is connected to the inlet of the reaction vessel. In an embodiment, the catalyst is selected from the group consisting of iron oxides, iron (III) perchlorate, amorphous and crystalline manganese oxides, amorphous and crystalline manganese oxyhydroxides, iron salts, iron sulfates, iron sulfides, and combinations thereof.

In an embodiment, the system comprises a first equalization tank, wherein the outlet of the first reaction vessel is connected to an inlet of the first equalization tank and wherein an outlet of the first equilibrium tank is connected to the inlet of the first particle separator.

In an embodiment, the system comprises a first particle separator, wherein an outlet of the first reaction vessel is connected to an inlet of the first particle separator, wherein a first outlet of the first particle separator is a solids outlet. In an embodiment, the first particle separator is selected from the group consisting of filtration devices, hydrocyclones, centrifuges, and combinations thereof.

In an embodiment, the system comprises a second equalization tank, wherein the second outlet of the first particle separator is connected to an inlet of the second equalization tank and wherein an outlet of the second equalization tank is connected to the inlet of the oil/water separator.

In an embodiment, the system comprises an oil/water separator, wherein a second outlet of the first particle separator is connected to an inlet of the oil/water separator, wherein a first outlet of the oil/water separator is an aqueous fraction outlet and wherein a second outlet of the oil/water separator is an organic fraction outlet. In an embodiment, the system comprises a second particle separator, wherein the outlet of the slurry tank is connected to an inlet of the second particle separator, wherein a first outlet of the second particle separator is a solids outlet, and wherein a second outlet of the second particle separator is connected to the inlet of the first reaction vessel. In an embodiment, the oil/water separator is selected from the group consisting of filtration devices, hydrocyclones, centrifuges, API oil/water separators or equivalent, and combinations thereof. In an embodiment, the oil/water separator is oriented such that an aqueous fraction material is conveyed by gravity from the aqueous fraction outlet to an aqueous storage device.

In an embodiment, the first particle separator or the oil/water separator is a hydrocyclone. In an embodiment, the first particle separator or the oil/water separator is a centrifuge.

In an embodiment, the first particle separator comprises a plurality of particle separators connected in parallel, wherein the second particle separator comprises a plurality of particle separators connected in parallel or wherein the oil/water separator comprises a plurality of oil/water separators connected in parallel.

In an embodiment, the first particle separator comprises a plurality of particle separators connected in series, wherein the second particle separator comprises a plurality of particle separators connected in series or wherein the oil/water separator comprises a plurality of oil/water separators connected in series.

In an embodiment, the first particle separator or the solids storage device has a sample port near the first outlet of the first particle separator to test solid materials for toxicity and/or other disposal criteria as may be required by federal and/or state law (e.g., Resource Conservation and Recovery Act (RCRA).

In an embodiment, the oil/water separator or the aqueous storage device has a sample port near the first outlet of the oil/water separator to test aqueous fraction materials for toxicity and/or other disposal criteria.

In an embodiment, a method for desorption of contaminates and treatment of contaminated sediments and soils using free radical chemical reaction and phase separation processes comprises the steps of: a) providing the system as discussed herein; b) creating and mixing a slurry of sediment or soil and water using a slurry tank; c) desorbing organic contaminants from a solid fraction of the slurry by mixing the slurry with an oxidant agent in a first reaction vessel and degrading the organic contaminants to produce a multi-phase slurry of aqueous, organic and solid fractions; d) separating smaller solid particles from the liquid fraction using a first particle separator; and e) separating the aqueous fraction from the organic fraction using an oil/water separator.

In an embodiment, the step b) of the method further comprises mixing the slurry with acid or base. In an embodiment, the acid is selected from the group consisting of carboxylic acids, mineral acids, organic acids, and combinations thereof or wherein the base is selected from the group consisting of mineral bases, organic bases, and combinations thereof. In an embodiment, the slurry has a pH of about 3.0 to about 6.8. In an embodiment, the slurry has a pH of about 8 to about 12.

In an embodiment, step b) of the method comprises creating and mixing the slurry of sediment or soil and water using the slurry tank and separating larger solid particles from the slurry using a second particle separator upstream of the first reaction vessel.

In an embodiment, step c) comprises desorbing organic contaminants from a solid fraction of the slurry by mixing the slurry with an oxidant agent in a first reaction vessel and degrading the organic contaminants to produce a multi-phase slurry of aqueous, organic and solid fractions. In an embodiment, the oxidant agent is selected from the group consisting of hydrogen peroxide, sodium persulfate, and combinations thereof. In an embodiment, the oxidant agent is hydrogen peroxide. In an embodiment, the oxidant agent is sodium persulfate. In an embodiment, the oxidant agent concentration is from about 1 mole to about 20 moles per kilogram of sediment or soil. In an embodiment, the oxidant agent concentration is from about 0.1% to about 20%.

In an embodiment, step c) further comprises mixing the slurry with a catalyst. In an embodiment, the oxidant agent and the catalyst form a hydroxyl radical, a superoxide radical anion and/or a hydroperoxide anion. In an embodiment, the catalyst is a metal oxide, a metal oxyhydroxide, metal salt or metal sulfide. In an embodiment, the catalyst is selected from the group consisting of iron oxides, iron (III) perchlorate, amorphous and crystalline manganese oxides, amorphous and crystalline manganese oxyhydroxides, iron salts, iron sulfates, iron sulfides, and combinations thereof. In an embodiment, the catalyst is an iron oxide. In an embodiment, the catalyst is a manganese oxide. In an embodiment, the catalyst is a manganese oxyhydroxide. In an embodiment, the catalyst is an iron sulfide.

In an embodiment, step d) of the method comprises separating smaller solid particles from the liquid fraction using a first equalization tank upstream of the first particle separator.

In an embodiment, step e) of the method further comprises separating the aqueous fraction from the organic fraction using a second equalization tank upstream of the oil/water separator.

In an embodiment, the method further comprises the step of screening coarse debris from the contaminated sediment or soil using a screener upstream of the slurry tank.

In an embodiment, the method further comprises the step of recycling the smaller solid particles to the first reaction vessel or a second reaction vessel for further treatment (when the smaller solid particles fail to meet toxicity and/or other disposal criteria. In an embodiment, the smaller solid particles are nonhazardous sediment or soil (when the smaller solid particles meet the toxicity and/or other disposal criteria).

In an embodiment, the method further comprises the step of recycling the larger solid particles from the slurry to the first reaction vessel or a second reaction vessel for further treatment (when the larger solid particles fail to meet the toxicity and/or other disposal criteria. In an embodiment, the larger solid particles are nonhazardous solids (when the larger solid particles meet the toxicity and/or other disposal criteria).

In an embodiment, the method further comprises the step of controlling the system in a continuous or a semi-continuous batch mode using a computing device.

These and other objects, features and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

For a further understanding of the nature and objects of the present inventions, reference should be made to the following detailed disclosure, taken in conjunction with the accompanying drawings, in which like parts are given like reference numerals, and wherein.

DETAILED DESCRIPTION OF EMBODIMENTS OF THE INVENTION

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

System for Treatment of Contaminated Sediments and Soils

Figure 1A:
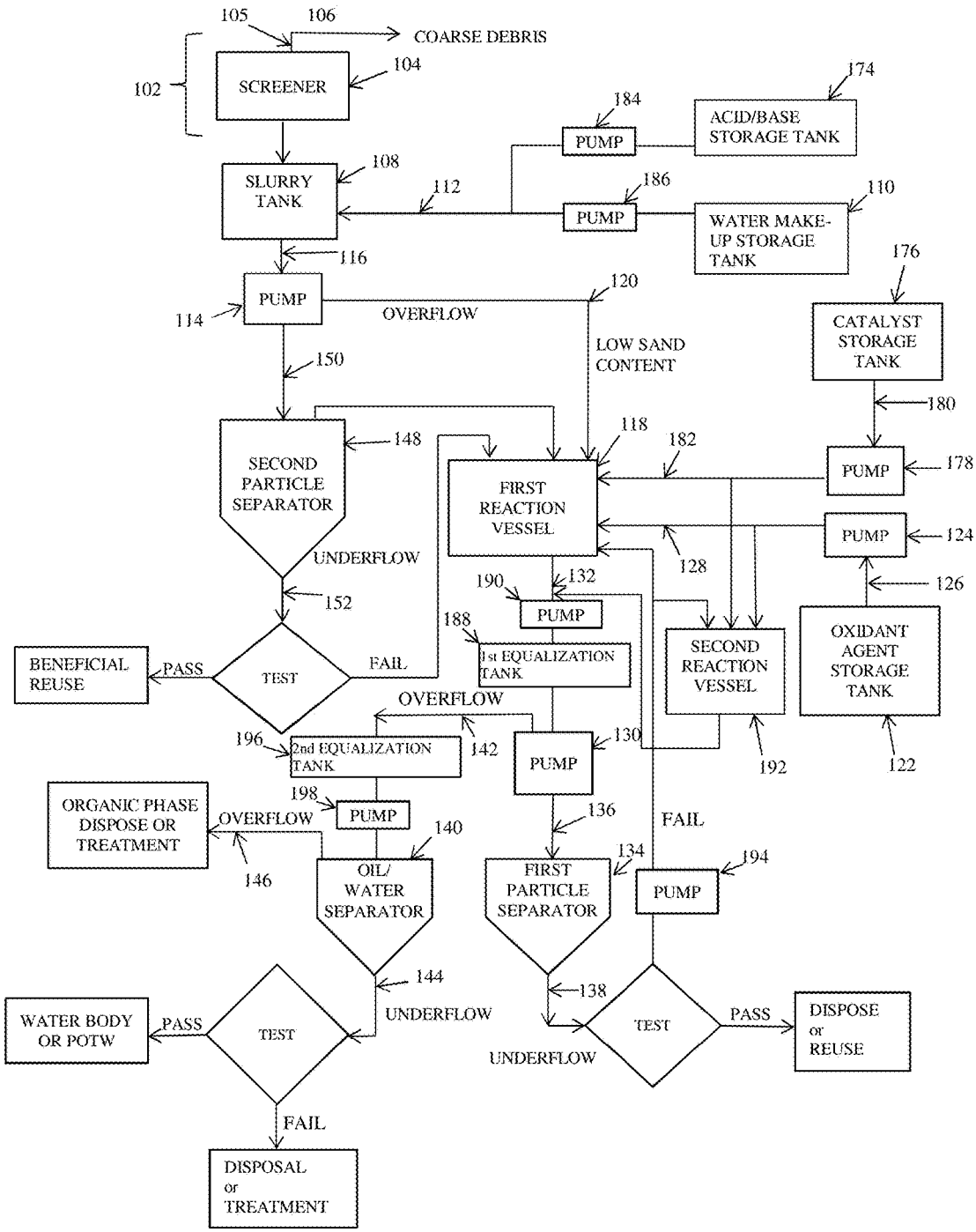
FIG. 1A illustrates a schematic of an exemplary system for treatment of contaminated sediments or soils using an integrated free radical chemical reaction and phase separation process according to an embodiment of the present invention.
Figure 1B:
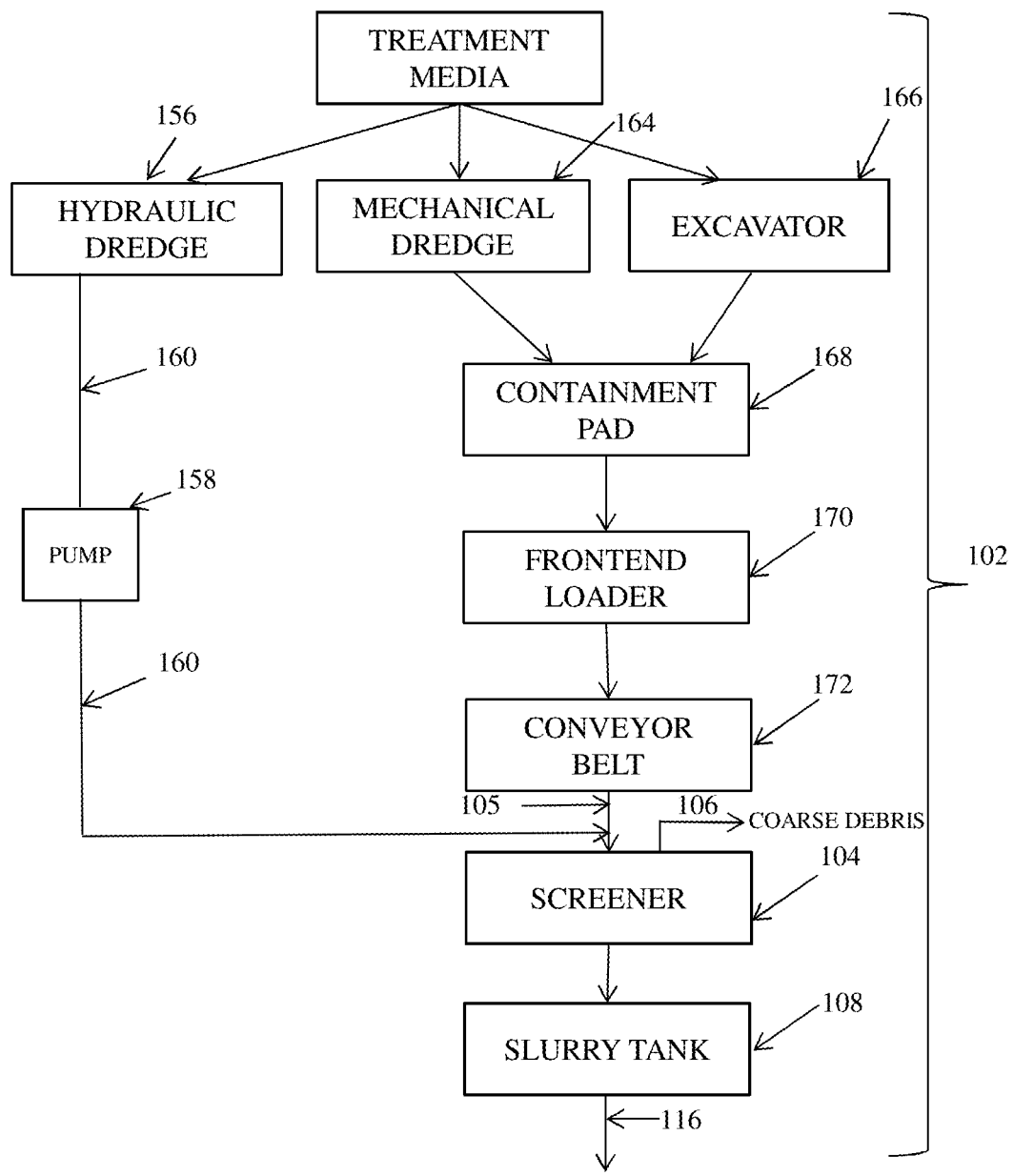
FIG. 1B illustrates a schematic of an exemplary contaminated sediment or soil inlet for the system of FIG. 1A.

A schematic of an exemplary system 100 for treatment of contaminated sediments or soils using an integrated free radical chemical reaction and phase separation processes according to an embodiment of the present invention is shown in FIGS. 1A and 1B. As shown in FIG. 1A, the system 100 comprises a sediment or soil inlet system 102, a slurry tank 108, a water make-up tank 110, a first reaction vessel 118, an oxidant agent storage tank 122, a first particle separator 134, and an oil/water separator 140. In an embodiment, each component of the system 100 is fluidly connected to a downstream component via piping. Piping is well known in the art.

In an embodiment, material may be conveyed from a component to a downstream component by gravity or momentum or via an optional pump, or a belt or screw conveyor. For example, material may be conveyed from or to the sediment or soil inlet system 102, the slurry tank 108 or any other component by gravity or momentum or via an optional fourth pump 158, or a belt or screw conveyor 172. Conveying material is well known in the art.

In an embodiment, the system 100 comprises a sediment or soil inlet system 102, an optional screener 104, a slurry tank 108, a water make-up tank 110, an optional acid/base storage tank 174, a first reaction vessel 118, an optional second reaction vessel 192, an oxidant agent storage tank 122, an optional catalyst storage tank 176, a first particle separator 134, an optional second particle separator 148, an oil/water separator 140, an optional first equalization tank 188, and an optional second equalization tank 196. In an embodiment, an outlet of the sediment and soil inlet system 102 feeds into a screen inlet 105 of the screener 104 or, alternatively, into a first inlet of the slurry tank 108.

In an embodiment, an optional first pump 114, an optional second pump 124, an optional third pump 130, an optional fourth pump 158, an optional fifth pump 178, an optional sixth pump 184, and optional seventh pump 186, an optional eighth pump 190, an optional ninth pump 194, and an optional tenth pump 198.

In an embodiment, the system 100 is capable of treating up to about 180 metric tons per hour (and any range or value there between) or up to 120 metric tons per hour (and any range or value there between) of contaminated sediments or soils. In an embodiment, if a higher throughput than up to about 60 metric tons per hour (and any range or value there between) is desired, a plurality of the system 100 may be connected or used in parallel to treat the contaminated sediments or soils.

In an embodiment, the system 100 may operate in a continuous or a semi-continuous batch mode.

Sediment or Soil Inlet System

Figure 2A:
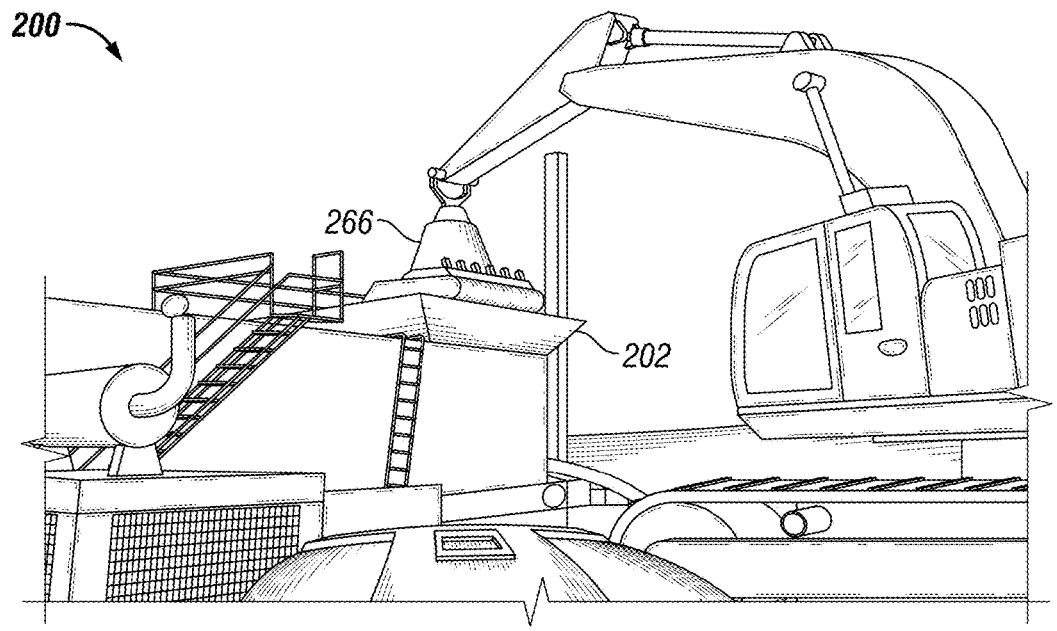
FIG. 2A illustrates a drawing of an exemplary screener disposed within a containment pad, showing an excavator delivering contaminated sediments or soils to the screener.

In an embodiment, a dredge may deliver sediments excavated from a contaminated water body site either directly or indirectly via a barge or a pipeline to a screener disposed within a containment pad. Similarly, an excavator may deliver soils either directly or indirectly via truck from a contaminated upland site to the screener. An exemplary screener disposed within a containment pad is depicted in FIG. 2A.

In an embodiment, the system 100 comprises a sediment or soil inlet system 102, as shown in FIGS. 1A and 1B. In an embodiment, the sediment or soil inlet system 102 comprises: a screener 104 comprising: a screen inlet 105; a first outlet of the screener 104, and a second outlet (e.g., coarse debris ejector) of the screener 104. In an embodiment, the first outlet of the screener 104 feeds into the first inlet of the slurry tank 108. In an embodiment, the second outlet 106 of the screener 104 is a coarse debris outlet.

In an embodiment, the sediment or soil may be delivered to a screen inlet 105, 205 of the screener 104 to retain coarse debris on the screen inlet 105, 205, while permitting the remainder of the excavated sediment or soil to feed an inlet of a slurry tank 108. (See e.g., FIGS. 2B-2C).

The screener 104 may be any suitable screener. A suitable screener 104 is available from Huber, VibraScreener, Inc., Rotex USA, and/or Midwestern Industries.

Figure 2B:
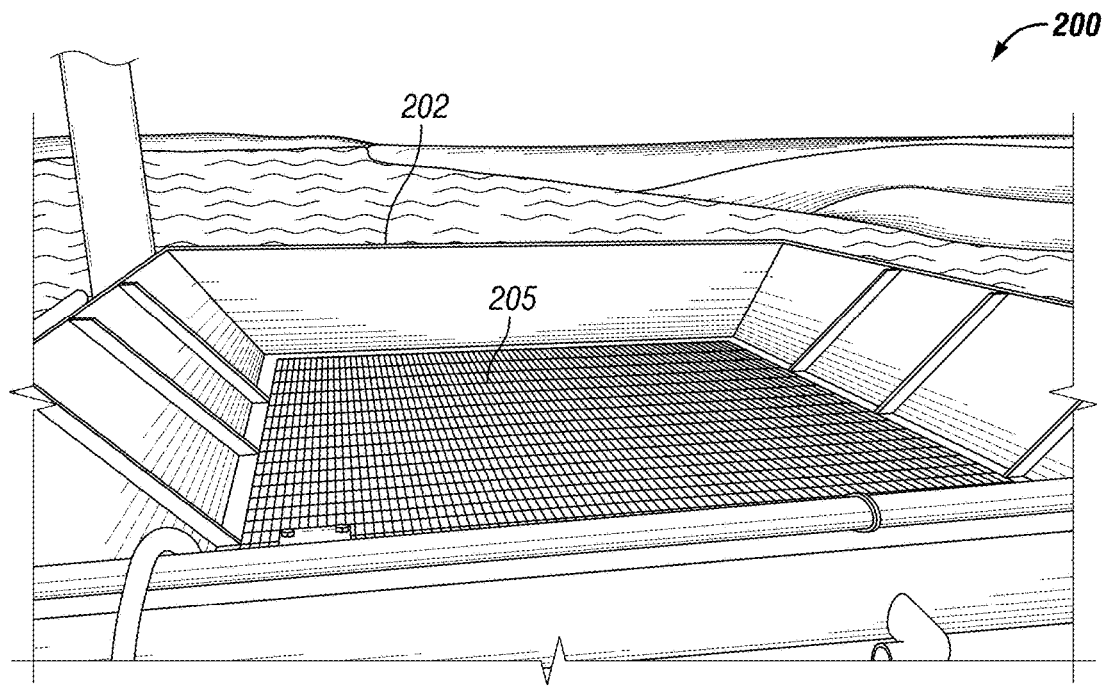
FIG. 2B illustrates a drawing of a close-up depiction of the screener of FIG. 2A, showing an empty screen before the contaminated sediments or soil was delivered to the screener by the excavator.
Figure 2C:
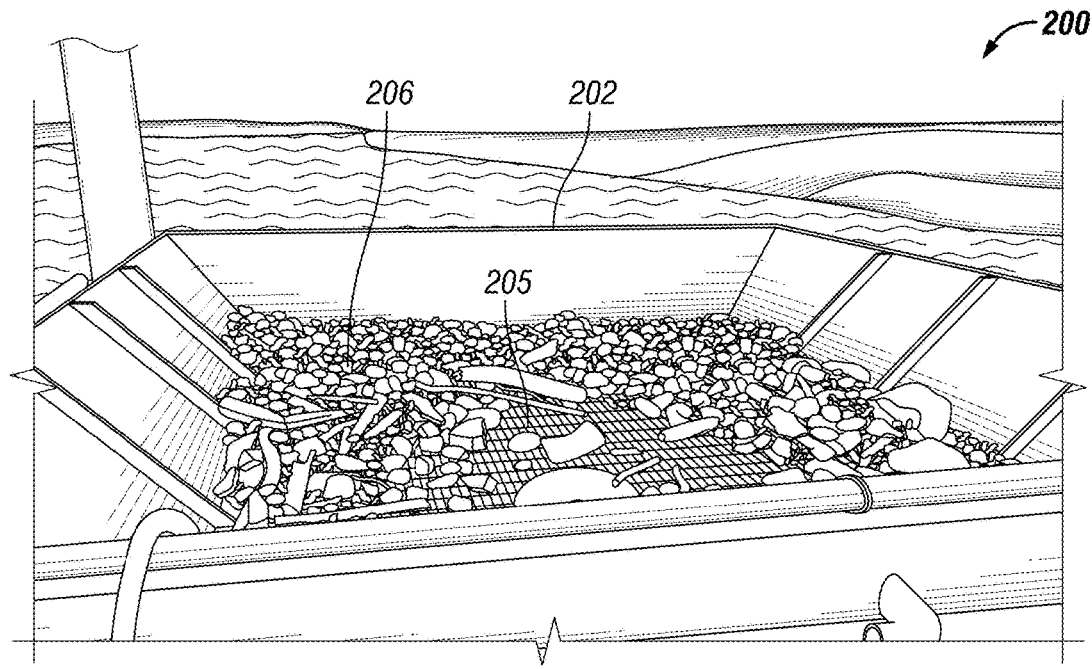
FIG. 2C illustrates a close-up drawing of the screener of FIG. 2A, showing separation of coarse debris in the screen after the contaminated sediment or soils were delivered to the screener.

An exemplary screener 204 is depicted in FIGS. 2A, 2B and 2C. As shown in FIG. 2C, the screener 204 comprises a screen inlet 205, a first outlet (not shown) and a second outlet 206 of the screener 204. In an embodiment, the screen inlet 205 prevents coarse debris materials from entering a first inlet of a slurry tank (not shown). In an embodiment, a first outlet of the screener 204 feeds into the first inlet of the slurry tank. In an embodiment, the second outlet 206 of the screener 204 is a coarse debris outlet.

In an embodiment, the sediment or soil inlet system 102 further comprises a shaker (not shown), wherein the shaker shakes the screen inlet 105, 205 of the screener 104 as shown in FIGS. 1A-1B and 2B-2C.

The shaker may be any suitable shaker. A suitable shaker is available from VibraScreener, Inc. and other vendors. In an embodiment, the shaker may be a LX Solids Separator™—Shale Shaker from VibraScreener, Inc.

In an embodiment, the sediment or soil inlet system 102 comprises a hydraulic dredge 156; and an optional fourth pump 158 as shown in FIG. 1B. In an embodiment, an outlet to the hydraulic dredge 156 is connected to an inlet of the fourth pump 158; and an outlet to the fourth pump 158 feeds into the screen inlet 105 of the screener 104 or, alternatively, an inlet to the slurry tank 108.

The hydraulic dredge 156 may be any suitable hydraulic dredge. Suitable hydraulic dredges are well known in the art.

The fourth pump 158 may be any suitable pump, or belt or screw conveyor. A suitable fourth pump 158 is available from American Process Systems, Eirich Machines, Inc. and other similar vendors. In an embodiment, the fourth pump 158 may be a belt or screw conveyor from Huber (Rotomat Screw conveyor—Ro 8/Ro 8t).

In an embodiment, the sediment or soil inlet system 102 comprises a mechanical dredge 164, and a belt or screw conveyor 172, as shown in FIG. 1B. In an embodiment, the mechanical dredge 164 is used to move treatment media from the water body to a suitable containment pad 168. Treatment media on the containment pad 168 is fed into an inlet of the conveyance system 172 by a front end loader 170 or other suitable piece of equipment. An outlet of the belt or screw conveyor 172 feeds into the screen inlet 105 (not shown) of the screener 104. The first outlet of the screener 104 feeds into the inlet of the slurry tank 108.

The mechanical dredge 164 may be any suitable mechanical dredge. Suitable mechanical dredges are well known in the art.

The front end loader 170 may be any suitable front end loader. Suitable front end loaders are well known in the art.

The belt or screw conveyor 172 may be any suitable belt or screw conveyor. Conveying material is well known in the art.

In an embodiment, the sediment or soil inlet system 102 comprises an excavator 166, and a screener 104, wherein the screener 104 comprises: a screen inlet 105, a first outlet of the screener 104 (not shown); and a second outlet of the screener 104 (not shown), and a shaker (not shown), as shown in FIG. 1B. In an embodiment, the excavator 166 is used to dig up the treatment media and deposit the treatment media in a containment pad 168. Treatment media on the containment pad 168 is transferred to an inlet of the conveyance system 172 by a front end loader 170 or other suitable piece of equipment. An outlet of the conveyance system 172 feeds into the screen inlet 105 of the screener 104. The first outlet of the screener 104 (not shown) feeds into a first inlet of the slurry tank 108. In an embodiment, the second outlet 106 of the screener 104 is a coarse debris outlet. In an embodiment, the shaker shakes the screen inlet 105.

The excavator 166 may be any suitable excavator. Suitable excavators are well known in the art. An exemplary excavator 266 is depicted in FIG. 2A.

Slurry Tank

In an embodiment, the system 100 comprises a slurry tank 108. In an embodiment, an outlet of the inlet system 102 may feed into a first inlet of the slurry tank 108 or, alternatively, a first outlet of an optional screener 104 may feed into the first inlet of the slurry tank 108. If the screener 104 is present, a first outlet of the screener 104 feeds into the inlet of the slurry tank 108. In an embodiment, an outlet of a water make-up tank 110 is connected to a second inlet of the slurry tank 108. In an embodiment, an outlet of the slurry tank 108 is connected to an inlet of a first reaction vessel 118. In an embodiment, an outlet of the slurry tank 108 is connected to an inlet of an optional first pump 114.

The slurry tank 108 may be any suitable slurry tank. Slurry tanks are well known in the art.

The slurry tank 108 may be any suitable size to provide a continuous feed of contaminated sediments or soils for treatment. In an embodiment, the slurry tank 108 should be sized to provide a continuous feed to an optional second particle separator 148 or a first reaction vessel 118. In an embodiment, the slurry tank 108 may be of sufficient size to provide up to about 120 cubic meters (and any range or value there between), about 90 cubic meters (and any range or value there between) or about 60 cubic meters (and any range or value there between) of contaminated sediments or soils to the optional second particle separator 148 or the first reaction vessel 118 up to about every 30 minutes (and range or value there between). In an embodiment, if a higher throughput than up to about 30 cubic meters up to about every 30 minutes is desired, a plurality of the slurry tank 108 may be used in parallel to treat the contaminated sediments or soils.

Figure 3:
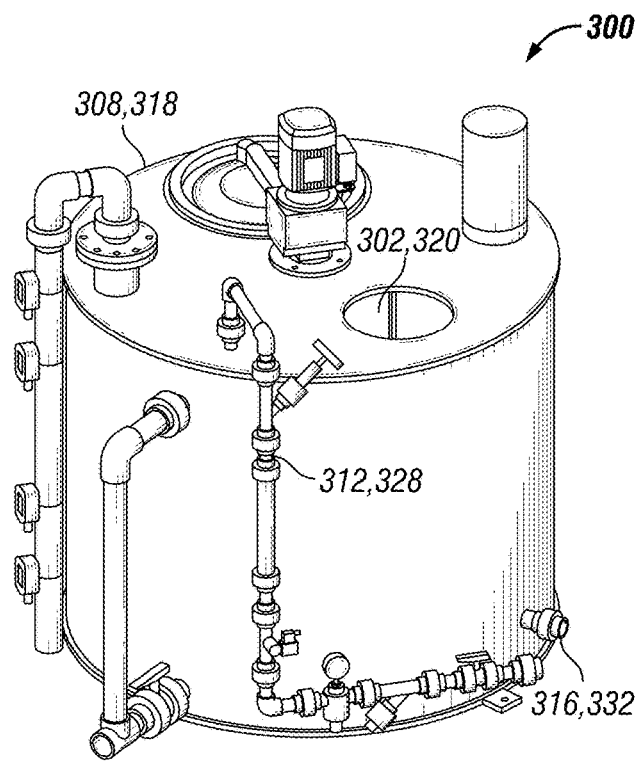
FIG. 3 illustrates a drawing of an exemplary slurry tank for the system in FIG. 1A.

An exemplary slurry tank 300 is depicted in FIG. 3. As shown in FIG. 3, the slurry tank 300 comprises a first inlet 302, a second inlet 312 and an outlet 316. In an embodiment, an outlet of the inlet system feeds (not shown) into the first inlet 302 of the slurry tank 300. In an embodiment, an outlet of a water make-up tank and an acid/base storage tank (not shown) is connected to the second inlet 312 of the slurry tank 300. In an embodiment, the outlet 316 of the slurry tank 300 is connected to an inlet of an optional first pump (not shown).

Water Make-Up Tank

In an embodiment, the system 100 comprises a water make-up tank 110. In an embodiment, an outlet of the water make-up tank 110 is connected to a second inlet of the slurry tank 108, as shown in FIG. 1A. In an embodiment, the outlet of the water make-up tank 110 is connected to a first inlet of a first line 112; and an outlet of the first line 112 is connected to the second inlet of the slurry tank 108.

In another embodiment, the outlet of the water make-up tank 110 is connected to an inlet of an optional seventh pump 186; an outlet of the seventh pump 186 is connected to the inlet of the first line 112; and an outlet of the first line 112 is connected to the second inlet of the slurry tank 108.

The water make-up tank 110 may be any suitable chemical storage tank. Chemical storage tanks are well known in the art.

Optional Acid/Base Storage Tank

In an embodiment, the system 100 comprises an optional acid/base storage tank 174, as shown in FIG. 1A. In an embodiment, an outlet of the acid/base storage tank 174 is connected to the second inlet of the slurry tank 108. In an embodiment, the outlet of the acid/base storage tank 174 is connected to a first inlet of the first line 112; and an outlet of the first line 112 is connected to a second inlet of the slurry tank 108.

In another embodiment, the outlet of the acid/base storage tank 174 is connected to an inlet of an optional sixth pump 184; an outlet of the sixth pump 184 is connected to a second inlet of the first line 112; and the outlet of the first line 112 is connected to the second inlet of the slurry tank 108.

The acid may be any suitable acid for adjusting the pH of the original slurry to the slurry tank 108. In an embodiment, the acid may be selected from the group consisting of Arrhenius acids (i.e., produce proton (H+)), Bronsted acids (i.e., accept hydroxide anion (OH−)), Lewis acids (i.e., accept an electron pair), mineral acids, organic acids, and combinations thereof. In an embodiment, the acid may be carboxylic acids, mineral acids, organic acids, and combinations thereof. In an embodiment, the acid may be a sulfuric acid or a sulfonic acid. In an embodiment, the acid may be a carboxylic acid. In an embodiment, the concentration and quantity of the acid is sufficient to adjust the pH of the original slurry to about 3 to about 6.8 (and any range or value there between). Adjustment of pH is well known in the art.

The base may be any suitable base for adjusting the pH of the original slurry to the slurry tank 108. In an embodiment, the base may be selected from the group consisting of Arrhenius bases (i.e., produce hydroxide anion (OH−)), Bronsted bases (i.e., accept proton (H+)), Lewis bases (i.e., donate an electron pair), mineral bases, organic bases, and combinations thereof. In an embodiment, the base may be mineral bases, organic bases, and combinations thereof. In an embodiment, the base may be an ammonium hydroxide or a sodium hydroxide. In an embodiment, the concentration and quantity of the base is sufficient to adjust the pH of the original slurry to about 8 to about 12 (and any range or value there between). Adjustment of pH is well known in the art.

The acid/base storage tank 174 may be any suitable chemical storage tank. Chemical storage tanks are well known in the art.

Alternatively, the acid/base storage tank 174 may be made of any suitable corrosion-resistant materials. The corrosion-resistant materials may be metals or plastics. Suitable corrosion-resistant metals include, but are not limited to, stainless steel, Monel® (or equivalent), Hastalloy® C (or equivalent), and combinations thereof; and suitable corrosion-resistant plastics include, but are not limited to, low density polyethylene, polycarbonate, polypropylene, polyvinylchloride, and combinations thereof. In an embodiment, the acid/base storage tank 174 may be selected from the group consisting of 316L stainless steel, Monel, Hastalloy C, and combinations thereof. In an embodiment, the acid/base storage tank 174 may be selected from the group consisting of low density polyethylene, polycarbonate, polypropylene, and polyvinylchloride.

Optional First Pump

In an embodiment, the system 100 comprises an optional first pump 114, as shown in FIG. 1A. In an embodiment, an outlet of the slurry tank 108 is connected to an inlet of the first pump 114. In an embodiment, a first outlet of the first pump 114 is connected to a first inlet of a first reaction vessel 118, as discussed below.

In an embodiment, a second outlet of the first pump 114 is connected to an inlet of an optional second particle separator 148, as discussed below.

The first pump 114 may be any suitable pump capable of pumping a high-solids content slurry. A suitable first pump 114 is available from American Process Systems, Eirich Machines, Inc. Pumps are well known in the art.

Figure 5:
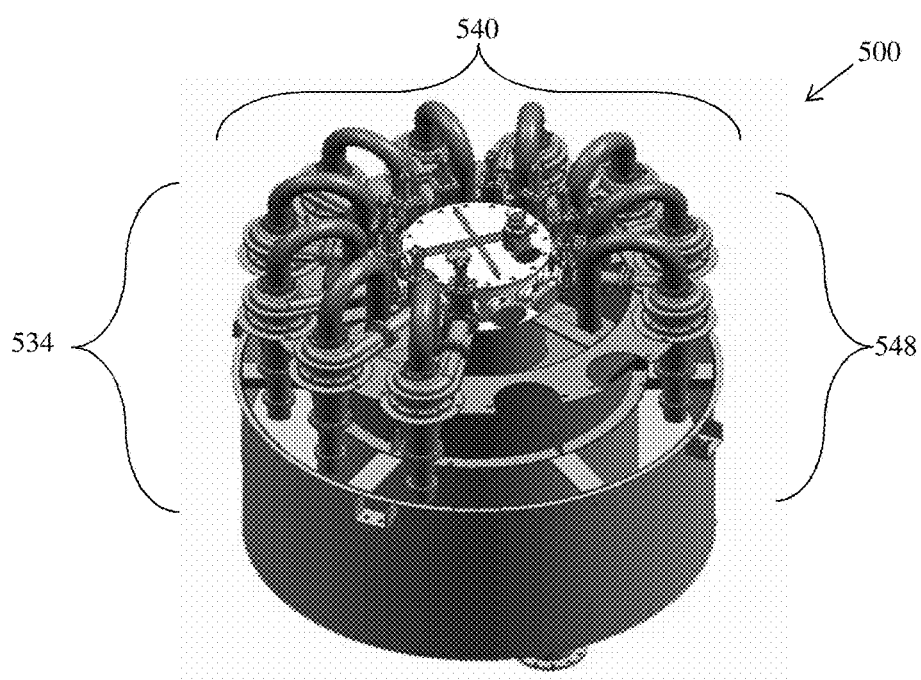
FIG. 5 is a 3D rendering of an exemplary manifold for the system of FIG. 1A, showing multiple inlets for a plurality of particle separators to separate sand from sediment or soil, a plurality of particle separators to separate liquids from solids, and a plurality of oil/water separators to separate aqueous and organic fractions.

To increase throughput, the first pump 114 may comprise a plurality of pumps connected in parallel. In an embodiment, the first pump 114 may be connected to a manifold (see e.g., FIG. 5) that will distribute slurry to a plurality of first reaction vessels 118 or second particle separators 148.

First Reaction Vessel

In an embodiment, the system 100 comprises a first reaction vessel 118, as shown in FIG. 1A. In an embodiment, the outlet of the slurry tank 108 is connected to the first inlet of the first reaction vessel 118; an outlet of an oxidant storage tank 122 is connected to a second inlet of the first reaction vessel 118; an outlet of an optional catalyst storage tank 176 is connected to a third inlet of the first reaction vessel 118; and an outlet of the first reaction vessel 118 is connected to an inlet of a first particle separator 134.

In another embodiment, the outlet of the slurry tank 108 is connected to an inlet of an optional first pump 114; the first outlet of the first pump 114 is connected to the first inlet of the first reaction vessel 118; the outlet of the oxidant storage tank 122 is connected to an inlet of an optional second pump 124; an outlet of the second pump 124 is connected to the second inlet of the first reaction vessel 118; the outlet of the catalyst storage tank 176 is connected to an inlet of an optional fifth pump 178; an outlet of the fifth pump 178 is connected to the third inlet of the first reaction vessel 118; and an outlet of the first reaction vessel 118 is connected to an inlet of a first particle separator 134.

The first reaction vessel 118 may be any suitable reaction vessel. In an embodiment, the first reaction vessel 118 comprises a tank, an agitator and a mixing device or impellers. In an embodiment, the first reaction vessel 118 should be capable of withstanding the pressures and temperatures of free radical chemical reactions; and should be capable of uniformly mixing the catalyst and oxidant agents into the slurry. In an embodiment, the first reaction vessel 118 should be capable of meeting America Society of Mechanical Engineers (ASME) requirements at specified pressures and temperatures. A suitable reaction vessel 118 is available from Mixer Direct. In an embodiment, the first reaction vessel 118 may be up to about 180 cubic meters in size (and any range or value there between).

In an embodiment, a mixer 600, 700 may be used as the first reaction vessel 118, as discussed above, or, alternatively, the mixer 600, 700 may be used upstream of the first reaction vessel 118, as discussed below. Mixers are well known in the art.

Figure 6:
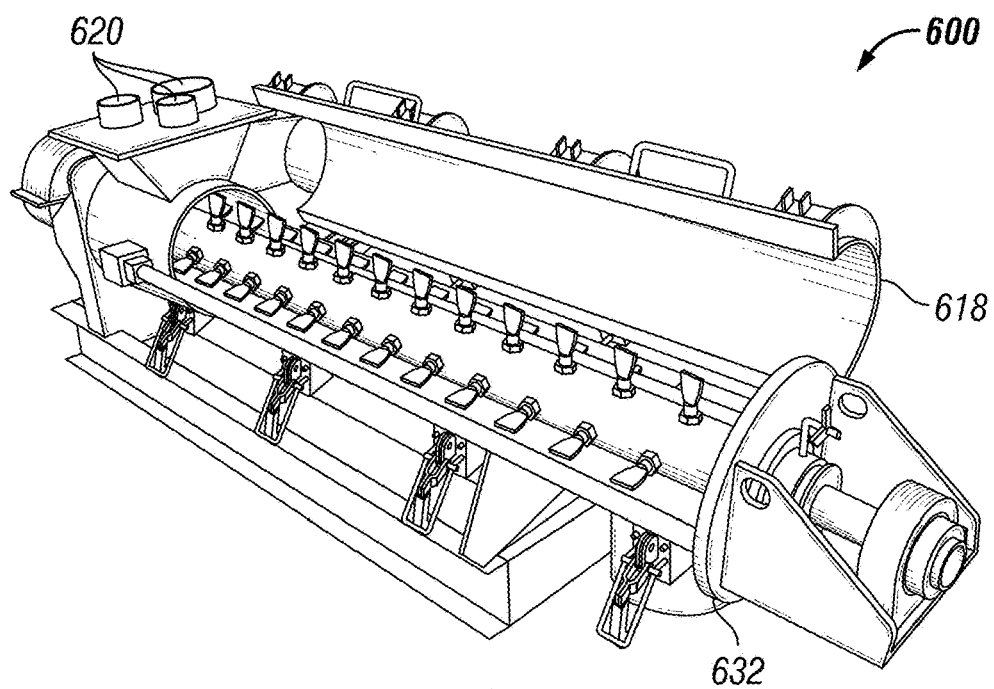
FIG. 6 illustrates a 3D rendering of an exemplary continuous mixer as a reaction vessel for the system of FIG. 1A.
Figure 7:
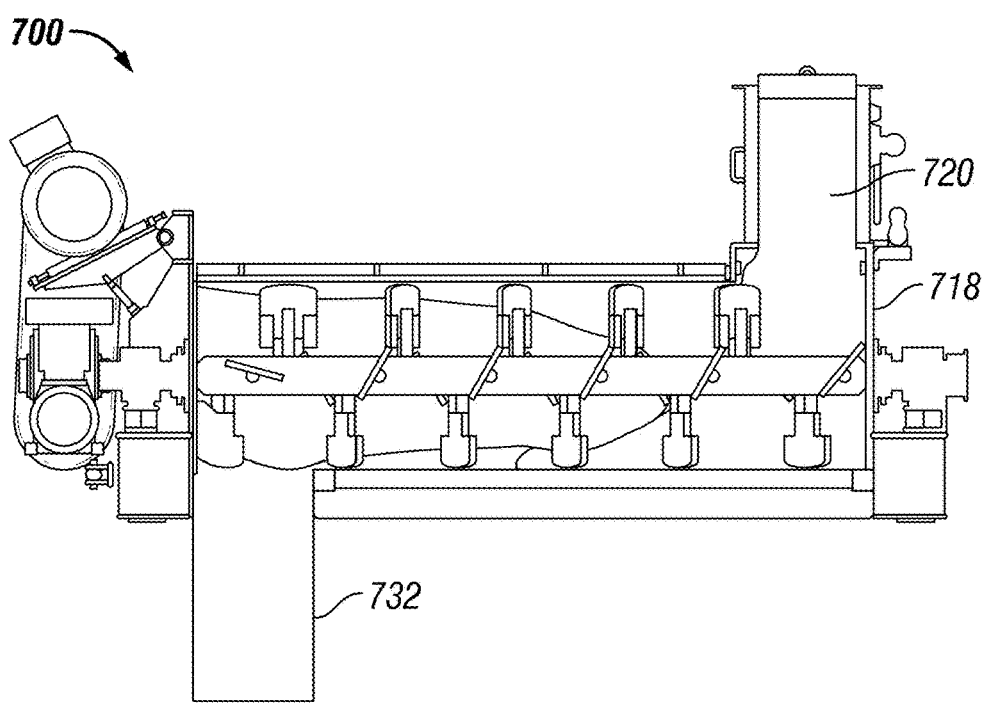
FIG. 7 illustrates a cross-sectional view of an exemplary continuous mixer as a reaction vessel for the system in FIG. 1A, showing mixing of a contaminated sediment or soil and an oxidant agent.

Exemplary mixers 600, 700 are depicted in FIGS. 6 and 7. As shown in FIG. 6, the mixer 600 comprises an inlet 620 and an outlet 632; and, as shown in FIG. 7, the mixer 700 comprises an inlet 720 and an outlet 732. In an embodiment, the outlet of the slurry tank 108 is connected to an inlet 620, 720 of the mixer 600,700; an outlet 632, 732 of the mixer 600, 700 is connected to the first inlet of the reaction vessel 118; an outlet of an oxidant storage tank 122 is connected to a second inlet of the first reaction vessel 118; an outlet of an optional catalyst storage tank 176 is connected to a third inlet of the first reaction vessel 118; and an outlet of the first reaction vessel 118 is connected to an inlet of a first particle separator 134 or, alternatively, to an inlet of a first equalization tank 188.

In another embodiment, the outlet of the slurry tank 108 is connected to an inlet of an optional first pump 114; a first outlet of the first pump 114 is connected to the inlet 620, 720 of the mixer 600, 700; the outlet 632, 732 of the mixer 600, 700 is connected to the first inlet of the first reaction vessel 118; the outlet of the oxidant storage tank 112 is connected to an optional second pump 124; the outlet of the second pump 124 is connected the second inlet of the first reaction vessel 118; the outlet of the catalyst storage tank 176 is connected to an inlet of an optional fifth pump 178; an outlet of the fifth pump 178 is connected to the third inlet of the first reaction vessel 118; and the outlet of the first reaction vessel 118 is connected to the inlet of the first particle separator 134 or, alternatively, to the inlet of the first equalization tank 188.

Free Radical Chemical Reaction

In an embodiment, the first reaction vessel 118 agitates and mixes the sediment or soil, the catalyst and the oxidant agent, resulting in an exothermic, free radical chemical reaction that causes desorption of organic contaminants from the solid particles of the sediments or soils. This free radical chemical reaction results in a formation of a slurry of solids and water, and a separate organic fraction comprised primarily of the organic contaminants which have been desorbed from the solid particles (i.e., the desorption process).

Activation of the oxidant agent results in the formation of a number of free radical chemical species. Since the formation of the free radical chemical species is an exothermic reaction, some quantity of heat may be produced. The interaction of these free radicals with the organic hydrocarbon contaminants on the sediment or soil particles results in degradation of contaminants either by electrophilic substitution to aromatic compounds, addition to alkenes, and/or hydrogen abstraction from saturated compounds (e.g., alkanes). Some researchers claim in the scientific literature that complete mineralization of the organic hydrocarbons (i.e., contaminants) to carbon dioxide and water may be possible. In addition to degradation of contaminates, the generated free radicals cause the desorption of the organic hydrocarbons (i.e., contaminates) from sediment or soil particles. The residence time of sediments or soils in the first reaction vessel 118 required to achieve the desired desorption and degradation of the organic hydrocarbons should be determined by laboratory bench scale studies to customize the treatment process based on site-specific conditions, factors and objectives. Since both the formation and the reaction of the free radical species with the organic hydrocarbons occur rapidly, the capacity to process certain sediments or soils in the first reaction vessel 118 may be determined for a continuous and a semi-continuous batch mode process.

Many soil and sediment contaminants are characterized by high hydrophobicity, having log octanol-water partition coefficients in the range of about 4 to about 9. Thus, such contaminants are present in the absorbed solid phase, and their desorption rates from the solid particles under natural conditions are often negligible. Since in situ oxidant agents function primarily in the aqueous phase, these absorbed contaminants must desorb or dissolve into the aqueous phase before the oxidant agent is effective in mediating their degradation. As the desorbed/dissolved contaminants are degraded in the aqueous phase, a concentration gradient increases between the absorbed solid phase and aqueous phase, driving subsequent desorption or dissolution. This process is, however, desorption- or dissolution-limited, and as stated previously, is generally very slow under natural conditions.

Treatment with catalyzed hydrogen peroxide significantly enhances the rate of desorption or dissolution of the absorbed contaminants. Not wishing to be bound by theory, the catalyzed hydrogen peroxide reaction is believed to be a modification of Fenton's reaction, as follows:

$$H_2O_2 + \text{Catalyst}_{Reduced} \rightarrow OH\cdot + OH^- + \text{Catalyst}_{Oxidized} \quad (1)$$

Hydrogen peroxide ($H_2O_2$) decomposes in the presence of catalyst resulting in the formation of hydroxyl radical (OH·), hydroxyl anion (OH$^-$) and oxidized catalyst as shown by chemical equation (1). A number of reactive oxygen species generated in the catalyzed decomposition of hydrogen peroxide have also been identified, as follows:

Hydroxyl radical (OH·)
Perhydroxyl radical (HO$_2$·)
Superoxide radical anion (O$_2$·$^-$)
Hydroperoxide anion (HO$_2^-$).

The latter three species are believed to be formed according to the following reaction pathways, respectively:

$$OH\cdot + H_2O_2 \rightarrow HO_2\cdot + H_2O \quad (2)$$

$$HO_2\cdot \rightarrow O_2\cdot^- + H^+ \quad (3)$$

$$HO_2\cdot + Fe^{2+} \rightarrow HO_2^- + Fe^{3+} \quad (4)$$

The hydroxyl radical (OH·) is a relatively non-specific oxidant that reacts with most organic compounds at near diffusion-controlled rates. It is one of the strongest oxidants found in nature. The perhydroxyl radical (HO$_2$·) is a relatively weak oxidant. The superoxide radical anion (O$_2$·$^-$) is a weak reductant and nucleophile. The hydroperoxide anion (HO$_2^-$) is a reductant and strong nucleophile.

Desorption of the contaminant may be promoted by superoxide radical anion (O$_2$·$^-$), followed by contaminant destruction in the bulk solution via hydroxyl radical (OH·) and the other reactive oxygen species identified above. It is believed that enhanced desorption of contaminants from the solid phase is mediated by a reductant or nucleophile in the catalyzed hydrogen peroxide reactions. Thus, in addition to superoxide radical anion (O$_2$·$^-$), hydroperoxide anion (HO$_2^-$) may also play an important role in the contaminant desorption process.

The reaction pathway of the decomposition of the oxidant agent appears to be highly dependent on the catalyst. For example, hydrogen peroxide decomposition mediated by soluble iron generates an increasing flux of superoxide radical anion (O$_2$·$^-$) with increasing concentration of the hydrogen peroxide. However, at lower hydrogen peroxide concentrations, hydroxyl radical (OH·) is the primary reactive oxygen species generated using an iron catalyst. Soluble manganese (II) facilitates the decomposition of hydrogen peroxide to hydroxyl radical (OH·), while solid manganese (oxide) rapidly decomposes hydrogen peroxide to superoxide radical anion (O$_2$·$^-$).

Further, the pH of the oxidant agent decomposition reaction appears to be highly dependent on the catalyst. In an embodiment, the pH of the original slurry is adjusted to about 3 to about 6.8 (and any range or value there between) or about 8 to about 12 (and any range or value there between), as discussed above. Adjustment of pH is well known in the art.

Although degradation of contaminants may be desirable, desorption of contaminants from the sediments or soils is more important to the treatment process. Thus, the free radical chemical reaction conditions, including the catalyst, oxidant agent, and pH, should be optimized to achieve maximum desorption of contaminants from the sediment or soil particles, and not for degradation of contaminants.

Optional Second Reaction Vessel

In an embodiment, the system 100 comprises an optional second reaction vessel 192, as shown in FIG. 1A. In an embodiment, a first outlet of the first particle separator 134 is connected to a first inlet of the second reaction vessel 192; an outlet of an oxidant storage tank 122 is connected to a second inlet of the second reaction vessel 192; an outlet of an optional catalyst storage tank 176 is connected to a third inlet of the second reaction vessel 192; and an outlet of the second reaction vessel 192 is connected to an inlet of a first particle separator 134 or, alternatively, to an inlet of a first equalization tank 188.

In another embodiment, the first outlet of the first particle separator 134 is connected to an inlet of an optional ninth pump 194; an outlet of the ninth pump 194 is connected to the first inlet of the first reaction vessel 118; the outlet of the oxidant storage tank 122 is connected to an inlet of an optional second pump 124; an outlet of the optional second pump 124 is connected to the second inlet of the second reaction vessel 192; the outlet of the catalyst storage tank 176 is connected to an inlet of an optional fifth pump 178; an outlet of the optional fifth pump 178 is connected to the third inlet of the second reaction vessel 192; and the outlet of the second reaction vessel 192 is connected to the inlet of the first particle separator 134 or, alternatively, to the inlet of the first equalization tank 188.

The second reaction vessel 192 may be any suitable reaction vessel, as discussed above with respect to the first reaction vessel 118. In an embodiment, the second reaction vessel 192 comprises a tank, an agitator and a mixing device or impellers. In an embodiment, the second reaction vessel 192 should be capable of withstanding the pressures and temperatures of free radical chemical reactions; and should be capable of uniformly mixing the catalyst and oxidant agents into the slurry. In an embodiment, the second reaction vessel 192 should be capable of meeting America Society of Mechanical Engineers (ASME) requirements at specified pressures and temperatures. A suitable reaction vessel 192 is available from Mixer Direct. In an embodiment, the second reaction vessel 192 may be up to about 180 cubic meters in size (and any range or value there between).

Oxidant Agent Storage Tank

In an embodiment, the system 100 comprises an oxidant agent storage tank 122, as shown in FIG. 1A. In an embodiment, an outlet of the oxidant agent storage tank 122 is connected to the second inlet of the first reaction vessel 118 and, optionally, to a second inlet of an optional second reaction vessel 192.

In another embodiment, an outlet from the oxidant agent storage tank 122 is connected to an inlet of the optional second pump 124; and the outlet of the second pump 124 is connected to the second inlet of the first reaction vessel 118 and, optionally to the second inlet of the second reaction vessel 192.

Increasing the oxidant agent concentration (e.g., hydrogen peroxide) to levels greater than about 1% (about 0.3 M) in the reaction drives the propagation reaction to form increasing amounts of non-hydroxyl radical species (e.g., superoxide radical anion and hydroperoxide anion), as discussed further below. Although more superoxide radical anion is generated at high hydrogen peroxide concentrations, more hydrogen peroxide is also consumed, lowering the stoichiometric efficiency of superoxide radical anion generation. In an embodiment, the stoichiometry of superoxide radical anion generation appears to be most effective when the concentrations of hydrogen peroxide ranges from about 0.03 M to about 0.294 M (and any range or value there between).

It has also been found that the hydrogen peroxide dosage required for the enhanced treatment of absorbed contaminants is directly proportional to the contaminant octanol-water partition coefficient (i.e., absorbed contaminants of higher hydrophobicity require higher dosages of hydrogen peroxide).

The oxidant agent may be any suitable oxidant agent capable of producing a hydroxyl radical, a superoxide radical anion and/or a hydroperoxide anion with or without a catalyst, as discussed below. Suitable oxidant agents include, but are not limited to, hydrogen peroxide, sodium persulfate, and combinations thereof. In an embodiment, the oxidant agent may be selected from the group consisting of hydrogen peroxide, sodium persulfate, and combinations thereof. In an embodiment, the oxidant agent may be hydrogen peroxide. In an embodiment, the oxidant agent may be sodium persulfate. In an embodiment, the concentration of the oxidant agent may be from about 1 mole to about 20 moles of oxidant agent per kilogram (and any range or value there between) of sediment or soil. In an embodiment, the oxidant agent may be hydrogen peroxide and the concentration of hydrogen peroxide may be from about 0.1% (about 0.03 M) to about 20% (about 6.0 M) (and any range or value there between).

The oxidant agent storage tank 122 may be any suitable chemical storage tank. Chemical storage tanks are well known in the art.

Alternatively, the oxidant agent storage tank 122 may be made of any suitable corrosion-resistant materials. The corrosion-resistant materials may be metals or plastics. Suitable corrosion-resistant metals include, but are not limited to, aluminum, aluminum-magnesium alloy, stainless steel, and combinations thereof; and suitable corrosion-resistant plastics include, but are not limited to, low density polyethylene, polycarbonate, polypropylene, polyvinylchloride, and combinations thereof. In an embodiment, the oxidant storage tank 122 may be selected from the group consisting of 99.5% pure aluminum, 304L stainless steel, and 316L stainless steel. In an embodiment, the oxidant storage tank 122 may be selected from the group consisting of low density polyethylene, polycarbonate, polypropylene, and polyvinylchloride.

Optional Catalyst Storage Tank

In an embodiment, the system 100 comprises an optional catalyst storage tank 176, as shown in FIG. 1A. In an embodiment, an outlet of the catalyst storage tank 176 is connected to the third inlet of the first reaction vessel 118 and, optionally, to a third inlet of an optional second reaction vessel 192.

In another embodiment, the outlet of the catalyst storage tank 176 is connected to an inlet of an optional fifth pump tank 178; and an outlet of the fifth pump 178 is connected to the third inlet of the first reaction vessel 118 and, optionally, to the third inlet of the second reaction vessel 192.

The catalyst may be any suitable catalyst capable of producing a hydroxyl radical, a superoxide radical anion and/or a hydroperoxide anion from the oxidant agent, as discussed below. Suitable catalysts include, but are not limited to, metal oxides, metal oxyhydroxides, metal salts, metal sulfides, and combinations thereof. In an embodiment, the catalyst may be selected from the group consisting of iron oxides, iron (III) perchlorate, iron sulfates, iron sulfides, amorphous and crystalline manganese oxides, amorphous and crystalline manganese oxyhydroxides, iron salts, iron sulfides, and combinations thereof. In an embodiment, the catalyst may be an iron sulfide. In an embodiment, the catalyst may be a manganese oxide. In an embodiment, the catalyst may be a manganese oxyhydroxide.

The catalyst storage tank 176 may be any suitable chemical storage tank. Chemical storage tanks are well known in the art.

Alternatively, the catalyst storage tank 176 may be made of any suitable corrosion-resistant materials. The corrosion-resistant materials may be metals or plastics. Suitable corrosion-resistant metals include, but are not limited to, aluminum, aluminum-magnesium alloy, stainless steel, and combinations thereof; and suitable corrosion-resistant plastics include, but are not limited to, low density polyethylene, polycarbonate, polypropylene, polyvinylchloride, and combinations thereof. In an embodiment, the catalyst tank 176 may be selected from the group consisting of 99.5% pure aluminum, 304L stainless steel, and 316L stainless steel. In an embodiment, the catalyst tank 176 may be selected from the group consisting of low density polyethylene, polycarbonate, polypropylene, and polyvinylchloride.

Optional Second Pump

In an embodiment, the system 100 comprises an optional second pump 124, as shown in FIG. 1A. In an embodiment, the outlet of the oxidant agent storage tank 122 is connected to the inlet of the second pump 124 and the outlet of the second pump 124 is connected to the second inlet of the first reaction vessel 118.

The second pump 124 may be any suitable pump capable of pumping oxidant agents. Pumps are well known in the art.

To increase throughput, the second pump 124 may comprise a plurality of pumps connected in parallel, wherein each of the plurality of pumps would provide oxidant agent to a separate reaction vessel 118. In an embodiment, the second pump 124 may be connected to a manifold (see e.g., FIG. 5) that would provide oxidant agent to the plurality of first reaction vessels 118.

Optional Third Pump

In an embodiment, the system 100 comprises an optional third pump 130, as shown in FIG. 1A. In an embodiment, an outlet of the first reaction vessel 118 is connected to an inlet of the third pump 130; and an outlet of the third pump 130 is connected to an inlet of a first particle separator 134.

In another embodiment, the outlet of the first reaction vessel 118 is connected to an optional first equalization tank 188; an outlet of the first equalization tank 188 is connected to the inlet of the third pump 130; and the outlet of the third pump 130 is connected to an inlet of a first particle separator 134.

The third pump 130 may be any suitable pump capable of pumping a high-solids content slurry. For example, a suitable pump includes, but is not limited to, a screw pump. In an embodiment, the third pump 130 is available from American Process Systems, Eirich Machines, etc.

To increase throughput, the third pump 130 may comprise a plurality of pumps connected in parallel, wherein each of the plurality of pumps would provide reacted slurry to a separate first particle separator 134. In an embodiment, the second pump 130 may be connected to a manifold (see e.g., FIG. 5) that would provide reacted slurry to the plurality of first particle separators 134.

Optional Fourth Pump

In an embodiment, the system 100 comprises an optional fourth pump 158, as shown in FIG. 1B. In an embodiment, the sediment or soil inlet system 102 comprises a hydraulic dredge 156; and a fourth pump 158 as shown in FIG. 1B. In an embodiment, an outlet to the hydraulic dredge 156 is connected to an inlet of the fourth pump 158 and an outlet to the fourth pump 158 is connected to the screen inlet 105 of the screener 104 or, alternatively, to the inlet of the slurry tank 108.

The fourth pump 158 may be any suitable pump, or belt or screw conveyor. A suitable fourth pump 158 is available from American Process Systems, Eirich Machines, Inc. and other similar vendors. In an embodiment, the fourth pump 158 may be a belt or screw conveyer from Huber (Rotomat Screw conveyor—Ro 8/Ro 8t).

To increase throughput, the fourth pump 158 may comprise a plurality of pumps connected in parallel and/or series, wherein each of the plurality of pumps would provide sediment and soil to a separate slurry tank 108. In an embodiment, the fourth pump 158 may be connected to a manifold (see e.g., FIG. 5) that would provide sediment and soil to a plurality of slurry tanks 108.

Optional Fifth Pump

In an embodiment, the system 100 comprises an optional fifth pump 178, as shown in FIG. 1A. In an embodiment, the outlet of the catalyst storage tank 176 is connected to the inlet of the fifth pump 178; and the outlet of the fifth pump 178 is connected to the third inlet of the first reaction vessel 118.

The fifth pump 178 may be any suitable pump capable of pumping catalyst solutions. Pumps are well known in the art.

To increase throughput, the fifth pump 178 may comprise a plurality of pumps connected in parallel, wherein each of the plurality of pumps would provide catalyst solution to a separate reaction vessel 118. In an embodiment, the fifth pump 178 may be connected to a manifold (see e.g., FIG. 5) that would provide catalyst solution to the plurality of reaction vessels 118.

Optional Sixth Pump

In an embodiment, the system 100 comprises an optional sixth pump 184, as shown in FIG. 1A. In an embodiment, the outlet of the acid/base storage tank 174 is connected to an inlet of the sixth pump 184; an outlet of the sixth pump 184 is connected to a second inlet of the first line 112; and the outlet of the first line 112 is connected to the second inlet of the slurry tank 108.

The sixth pump 184 may be any suitable pump capable of pumping acid/base solutions. Pumps are well known in the art.

To increase throughput, the sixth pump 184 may comprise a plurality of pumps connected in parallel, wherein the plurality of pumps would provide acid/base solution to a separate slurry tank 108. In an embodiment, the sixth pump 184 may be connected to a manifold (see e.g., FIG. 5) that would provide acid/base solution to the plurality of slurry tanks 108.

Optional Seventh Pump

In an embodiment, the system 100 comprises an optional seventh pump 186, as shown in FIG. 1A. In another embodiment, the outlet of the water make-up tank 110 is connected to an inlet of the seventh pump 186; an outlet of the seventh pump 186 is connected to the inlet of the first line 112; and an outlet of the first line 112 is connected to the second inlet of the slurry tank 108.

The seventh pump 186 may be any suitable pump capable of pumping aqueous solutions. Pumps are well known in the art.

To increase throughput, the seventh pump 186 may comprise a plurality of pumps connected in parallel, wherein the plurality of pumps would provide water make-up solution to a separate slurry tank 108. In an embodiment, the seventh pump 186 may be connected to a manifold (see e.g., FIG. 5) that would provide water make-up solution to the plurality of slurry tanks 108.

First Particle Separator

In an embodiment, the system 100 comprises a first particle separator 134, as shown in FIG. 1A. In an embodiment, an outlet of the first reaction vessel 118 is connected to an inlet of the first particle separator 134, or, alternatively, to an inlet of the first equalization tank 188, wherein an outlet of the first equalization tank 188 is connected to the inlet of the first particle separator 134. In an embodiment, a first outlet 138 of the first particle separator 134 is a solids fraction outlet 138; and a second outlet 142 of the first particle separator 134 is an aqueous and organic fractions outlet 142.

In another embodiment, the outlet of the first reaction vessel 118 is connected to an inlet to an optional third pump 130, wherein an outlet of the third pump 130 is connected to the inlet of the first particle separator 134 or, alternatively, the outlet of the first reaction vessel 118 is connected to an optional eighth pump 190, wherein an outlet of the eighth pump 190 is connected to the inlet of the first equalization tank 188; the outlet of the first equalization tank 188 is connected to the inlet of the third pump 130 and the outlet of the third pump 130 is connected to the inlet of the first particle separator 134.

In an embodiment, the first outlet 138 of the first particle separator 134 is a solids fraction outlet 138. In an embodiment, the first outlet 138 of the first particle separator 134 outputs solids from the original slurry with a grain size of greater than or equal to about 0.01 millimeters in diameter, preferably greater than or equal to about 0.005 millimeters in diameter, more preferably greater than or equal to about 0.003 millimeters in diameter, and most preferably greater than or equal to about 0.002 millimeters in diameter, and any range or value between about 0.001 and about 0.01 millimeters in diameter. In an embodiment, the first outlet 138 of the first particle separator 134 outputs solids from the reacted slurry with a grain size consistent with fines sands and/or silt and clay materials (i.e., greater than or equal to about 0.002 millimeters in diameter).

In an embodiment, the first particle separator 134 is oriented such that the solid particles are conveyed by gravity from the first outlet 138 of the first particle separator 134 to a solids storage device (not shown). In an embodiment, the solids storage device may be selected from the group consisting of a rolloff box, a truck, and a designated staging area.

In an embodiment, the first particle separator 134 may have a sample point or port at or near the first outlet 138 of the first particle separator 134 to test the solids for toxicity and/or other disposal criteria as may be required by federal and/or state law (e.g., RCRA). In an embodiment, the solids storage device (not shown) may have a sample point or port. In an embodiment, if the solids fail to meet toxicity and/or other disposal criteria, the solids may be recycled to the first inlet of the first reaction vessel 118 or, alternatively, transferred to a first inlet of an optional second reaction vessel 192 for further treatment and/or disposed of in the appropriate solid waste facility. In an embodiment, if the solids pass the toxicity and/or other disposal criteria, the solids may be transported offsite and sold for beneficial use, or disposed of as non-hazardous material in a landfill.

In an embodiment, the second outlet 142 of the first particle separator 134 is an aqueous and organic fraction outlet 142. In an embodiment, the second outlet 142 outputs the aqueous and organic fractions of the original slurry (along with any residual solids). In an embodiment, the second outlet 142 of the first particle separator 134 is connected to an inlet of an oil/water separator 140.

The first particle separator 134 may be any suitable particle separator. For example, a suitable particle separator includes, but is not limited to, a filtration device, a hydrocyclone and a centrifuge. In an embodiment, the first particle separator 134 may be selected from the group consisting of filtration devices, hydrocyclones, centrifuges, and combinations thereof.

In an embodiment, the first particle separator 134 may be a filtration device. Suitable filtration devices include but are not limited to, plate and frame filter presses. Suitable filtration devices are well-known in the art.

In an embodiment, the first particle separator 134 may be a hydrocyclone. In an embodiment, the hydrocyclone should be designed with the proper geometrical relationship between the cyclone diameter, inlet area, vortex finder, apex orifice, and sufficient length to provide retention time, given the inlet pressure, so that, most preferably, solids greater than about 0.002 millimeter in diameter (i.e., as small as possible) may be removed through the apex (first outlet) in the underflow, while the remaining smaller solid particles and liquids may be extracted through the vortex with the overflow (second outlet).

A suitable first particle separator 134 is available from Cavex Hydrocyclones, FLSmidth, GEA, SWECO, Schlumberger, and others.

Figure 4:
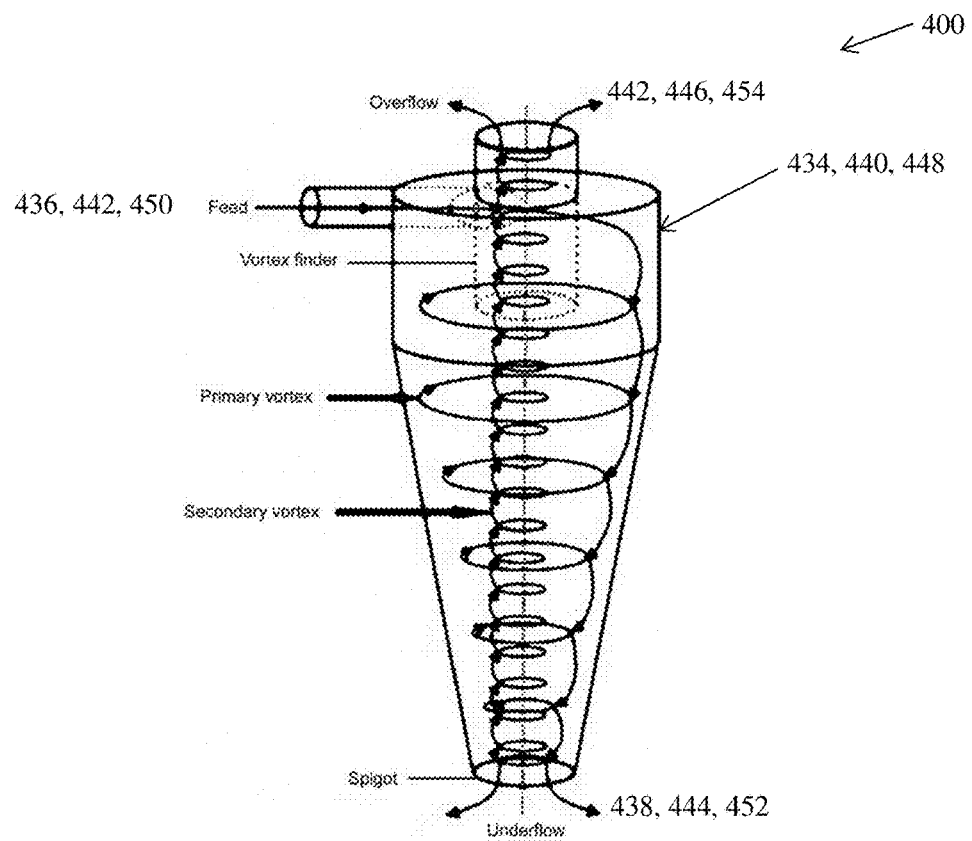
FIG. 4 illustrates a schematic of an exemplary hydrocyclone as a particle separator for the system of FIG. 1A.

An exemplary hydrocyclone 400 is depicted in FIG. 4. As shown in FIG. 4, the hydrocyclone 400 comprises an inlet 436, a first outlet 438 and a second outlet 442. In an embodiment, the hydrocyclone 400 may be the first particle separator 434. In an embodiment, the outlet of the first reaction vessel 118 is connected to the inlet 436 of the first particle separator 434, as shown in FIGS. 1A and 4.

In another embodiment, the outlet of the first reaction vessel 118 is connected to an inlet of an optional third pump 130; and an outlet of the third pump 130 is connected to the inlet 436 of the first particle separator 434, as shown in FIGS. 1A and 4.

In an embodiment, the first particle separator 134, 434 may be a centrifuge. Suitable centrifuges are described in U.S. Pat. Nos. 4,175,040, 4,959,158 and 5,591,340.

Figure 14:
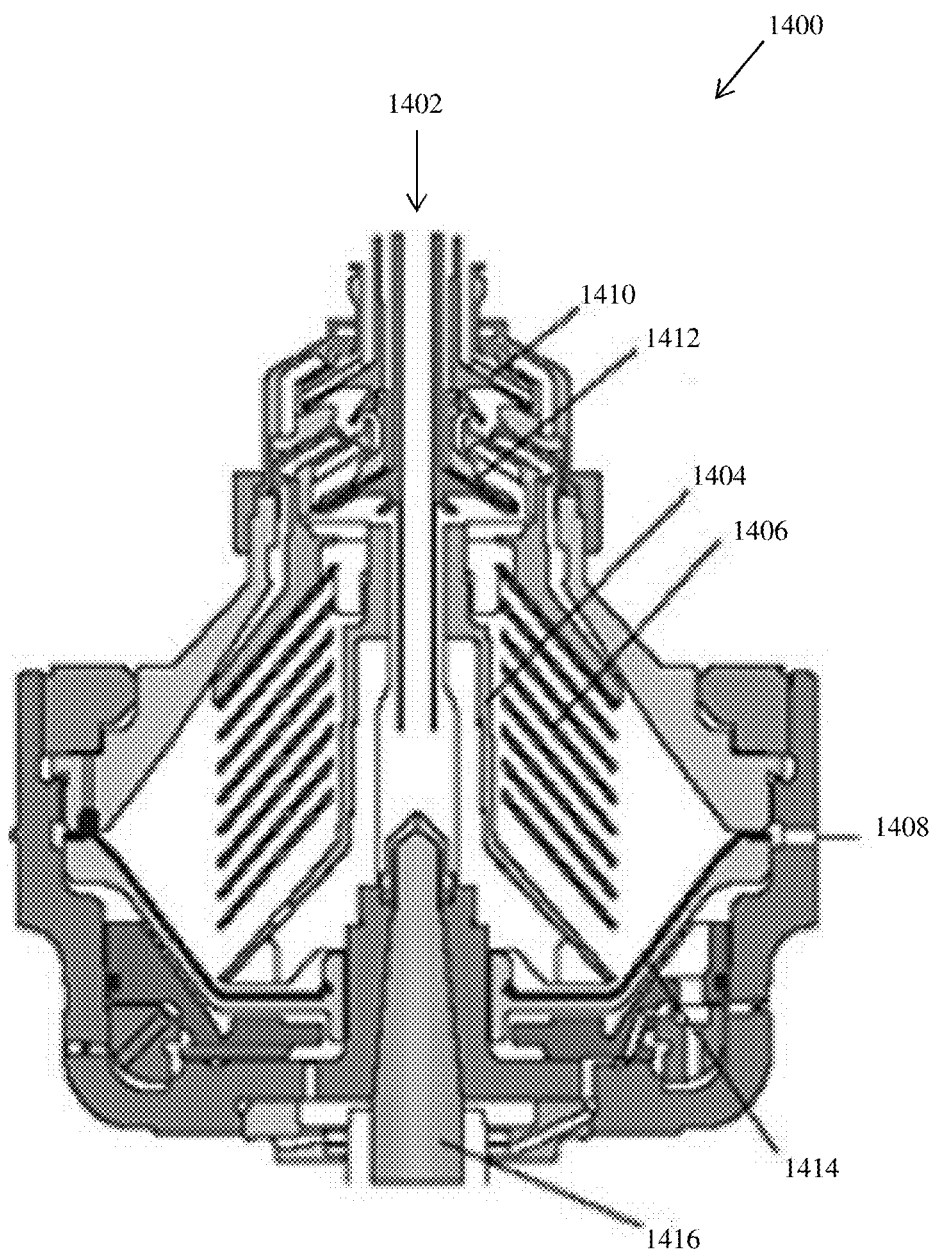
FIG. 14 illustrates an exemplary centrifuge as a particle separator for the system in FIG. 1A.

An exemplary centrifuge 1400 is depicted in FIG. 14. As shown in FIG. 14, the centrifuge 1400 comprises an inlet 1402, a distributor 1404, a disc stack 1406, a first solids fraction outlet 1408, a second aqueous fraction outlet 1410, and a second organic fraction outlet 1412, wherein the first solids fraction outlet 1408 comprises a sliding bottom bowl 1414 mounted on a spindle 1416. Centrifuge 1400 is shown for illustration purposes only. Although centrifuge 1400 separates the aqueous fraction outlet 1410 and the organic fraction outlet 1412, some types of centrifuges combine these aqueous and organic outlets as a combined liquids fraction outlet. In an embodiment, the centrifuge 1400 may be the first particle separator 134. In an embodiment, the outlet of the first reaction vessel 118 is connected to the inlet of the first particle separator 134, 1400, as shown in FIGS. 1A and 14.

In an embodiment, a first outlet 138, 438, 1408 of the first particle separator 134, 434, 1400 is a solids fraction outlet 138, 438, 1408. In an embodiment, the first outlet 138, 438, 1408 of the first particle separator 134, 434, 1400 outputs solids from the reacted slurry with a grain size of greater than or equal to about 0.01 millimeters in diameter, preferably greater than or equal to about 0.005 millimeters in diameter, more preferably greater than or equal to about 0.003 millimeters in diameter, and most preferably greater than or equal to about 0.002 millimeters in diameter, and any range or value between about 0.001 and about 0.01 millimeters in diameter. In an embodiment, the first outlet 138, 438, 1408 of the first particle separator 134, 434, 1400 outputs solids from the reacted slurry with a grain size consistent with fine sands, and/or silt and clay materials (i.e., greater than or equal to about 0.002 millimeters in diameter). In an embodiment, the second outlet 142, 442, 1410 or 1412 of the first particle separator 134, 434, 1400 is connected to an inlet of an oil/water separator 140.

Figure 11:
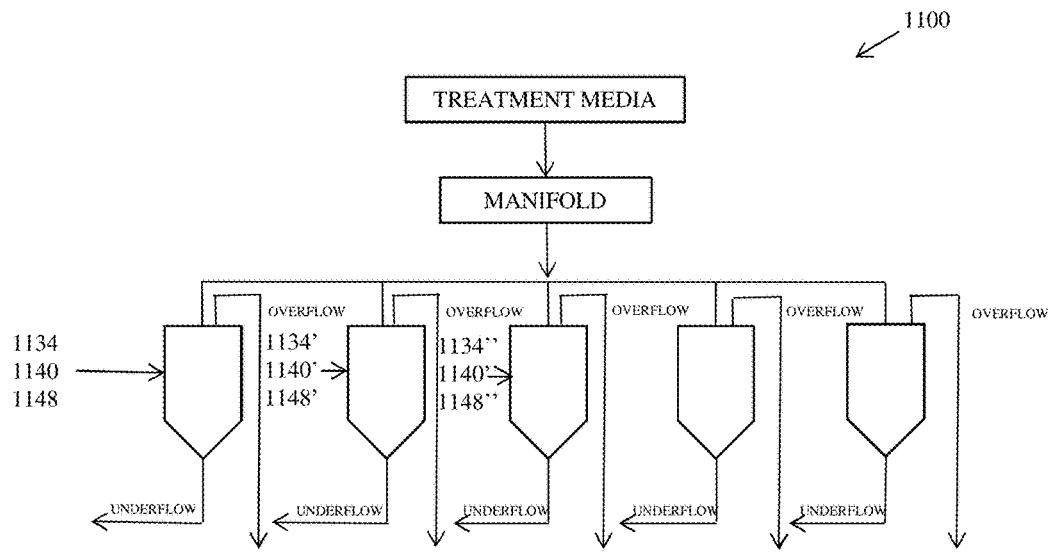
FIG. 11 illustrates an exemplary plurality of particle separators or oil/water separators connected in parallel for the system of FIG. 1A.

To increase throughput, the first particle separator 134 may comprise a plurality of parallel particle separators, wherein each particle separator is connected to a manifold (see e.g., FIG. 5) to a tank or to an oil/water separator 140. An exemplary plurality of particle separators 1100 connected in parallel is depicted in FIG. 11. In an embodiment, the plurality of particle separators 1100 connected in parallel 1134, 1134', 1134", etc. may be used as the first particle separator 134.

Figure 12:
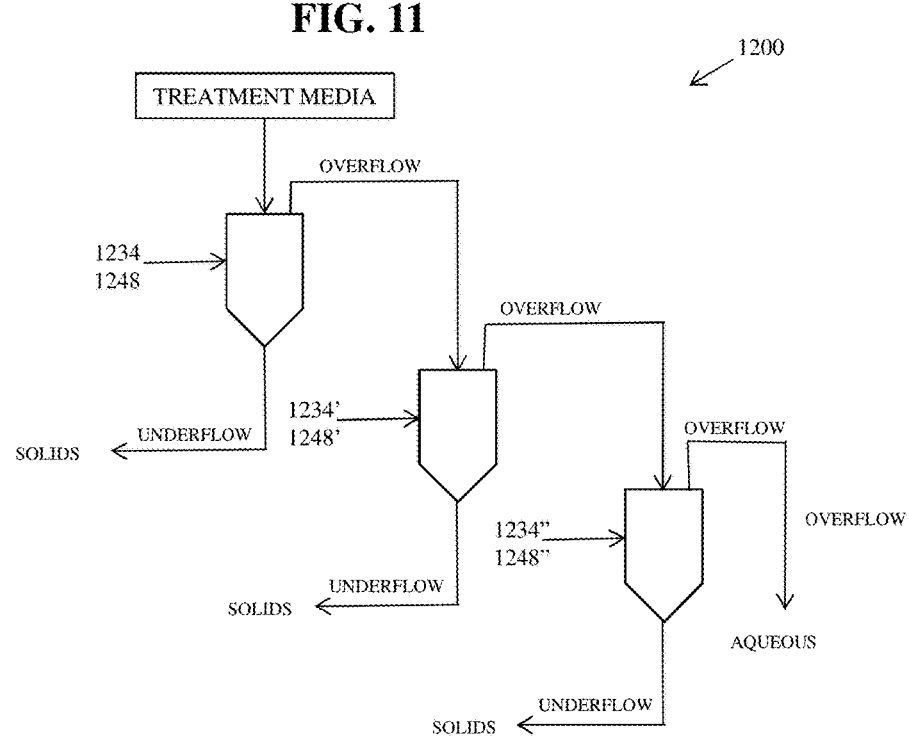
FIG. 12 illustrates an exemplary plurality of particle separators connected in series for the system of FIG. 1A.
Figure 13:
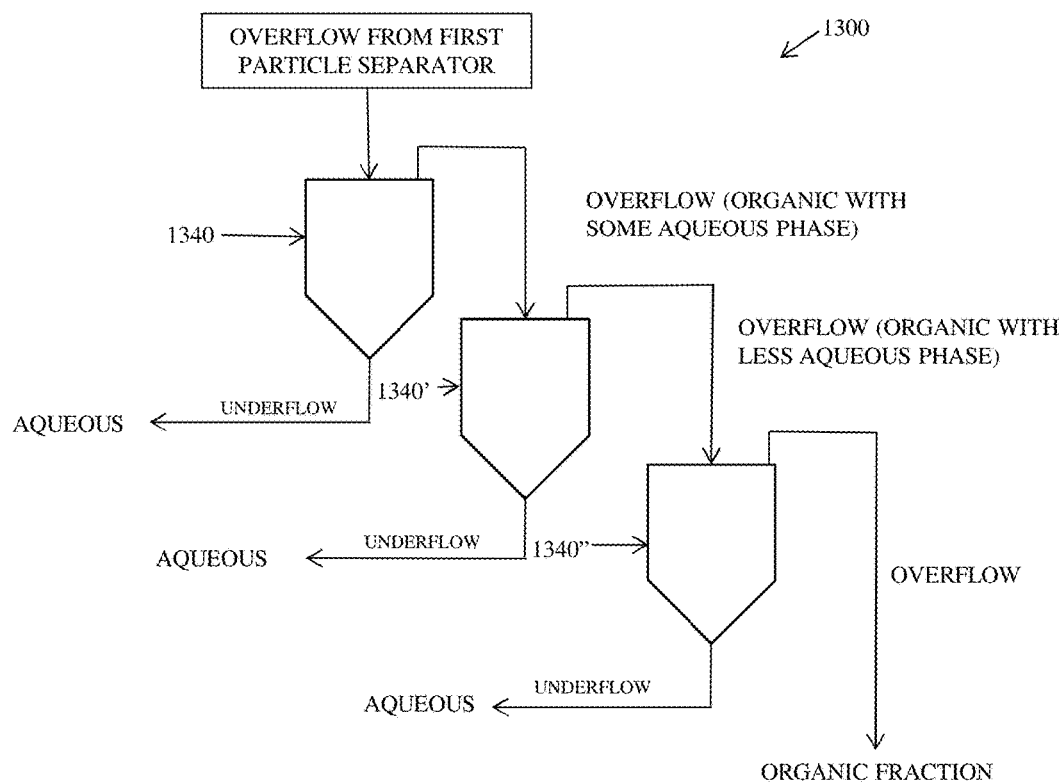
FIG. 13 illustrates an exemplary plurality of oil/water separators connected in series for the system of FIG. 1A.

To increase the efficiency of solids removal, the first particle separator 134 may comprise a plurality of particle separators connected in series. An exemplary plurality of particle separators 1200 connected in series is depicted in FIG. 12. In an embodiment, the plurality of particle separators 1200 connected in series 1234, 1234', 1234", etc. may be used as the first particle separator 134.

In an embodiment, the plurality of particle separators may be connected in parallel, series, and combinations thereof to optimize efficiency and throughput.

Optional First Equalization Tank

In an embodiment, the system 100 comprises an optional first equalization tank 188, as shown in FIG. 1A.

In an embodiment, an outlet of the first reaction vessel 118 is connected to an inlet of the first equalization tank 188; an outlet of the first equalization tank 188 is connected to an inlet of a first particle separator 134.

In another embodiment, an outlet of the first reaction vessel 118 is connected to an inlet of an optional eighth pump 190; an outlet of the eighth pump 190 is connected to an inlet of the first equalization tank 188; an outlet of the first equalization tank 188 is connected to the inlet of an optional third pump 130; and an outlet of the third pump 130 is connected to the inlet of the first particle separator 134.

The first equalization tank 188 may be any suitable chemical storage tank. Chemical storage tanks are well known in the art.

Alternatively, the first equalization tank 188 may be made of any suitable corrosion-resistant materials. The corrosion-resistant materials may be metals or plastics. Suitable corrosion-resistant metals include, but are not limited to, aluminum, aluminum-magnesium alloy, stainless steel, and combinations thereof; and suitable corrosion-resistant plastics include, but are not limited to, low density polyethylene, polycarbonate, polypropylene, polyvinylchloride, and combinations thereof. In an embodiment, the first equalization tank 188 may be selected from the group consisting of 99.5% pure aluminum, 304L stainless steel, and 316L stainless steel. In an embodiment, the first equalization tank 188 may be selected from the group consisting of low density polyethylene, polycarbonate, polypropylene, and polyvinylchloride.

Optional Eighth Pump

In an embodiment, the system 100 comprises an optional eighth pump 190, as shown in FIG. 1A. In an embodiment, an outlet of the first reaction vessel 118 is connected to an inlet of the eighth pump 190; and an outlet of the eighth pump 190 is connected to an inlet of an optional first equalization tank 188.

The eighth pump 190 may be any suitable pump capable of pumping reacted slurry. Pumps are well known in the art.

To increase throughput, the eighth pump 190 may comprise a plurality of pumps connected in parallel, wherein the plurality of pumps would provide reacted slurry to a separate equalization tank. In an embodiment, the eighth pump 190 may be connected to a manifold (see e.g., FIG. 5) that would provide reacted slurry to a plurality of equalization tanks 188.

Optional Ninth Pump

In an embodiment, the system 100 comprises an optional ninth pump 194, as shown in FIG. 1A. In an embodiment, a first outlet of the first particle separator 134 is connected to an inlet of the ninth pump 194; and an outlet of the ninth pump 194 is connected to a first inlet of the first reaction vessel 118 or, alternatively, to a first inlet of an optional second reaction vessel 192.

The ninth pump 194 may be any suitable pump capable of pumping reacted slurry. Pumps are well known in the art.

Oil/Water Separator

In an embodiment, the system 100 comprises an oil/water separator 140, as shown in FIG. 1A. In an embodiment, a second outlet 142 of the first particle separator 134 is connected to an inlet of the oil/water separator 140; a first outlet 144 of the oil/water separator 140 is an aqueous fraction outlet 144; and a second outlet 146 of the oil/water separator 140 is an organic fraction outlet 146.

In another embodiment, a second outlet 142 of the first particle separator 134 is connected to an inlet of an optional second equalization tank 196; an outlet of the second equalization tank 196 is connected to an inlet of an optional tenth pump 198; and an outlet of the tenth pump 198 is connected to an inlet of the oil/water separator 140.

In an embodiment, the first outlet 144 outputs aqueous fraction materials. In an embodiment, the oil/water separator 140 is oriented such that the aqueous fraction materials are conveyed by gravity from the first outlet 144 to an aqueous storage device (not shown). In an embodiment, the aqueous storage device may be selected from the group consisting of a tank, a truck, a holding pond and a water body.

In an embodiment, the oil/water separator 140 may have a sample point or port at or near the first outlet 144 of the oil/water separator 140 to test the aqueous phase materials for toxicity and/or other disposal criteria as may be required by federal and/or state law (e.g., RCRA). In an embodiment, the aqueous storage devise may have a sample point or port. In an embodiment, if the aqueous fraction materials fail to meet toxicity and/or other disposal criteria, the aqueous fraction materials may be recycled to the first inlet of the first reaction vessel 118 or, alternatively, transferred to the first inlet of the second reaction vessel 192 and/or subjected to further alternative treatment prior to disposal. In an embodiment, if the aqueous fraction materials pass the toxicity and/or other disposal criteria, the aqueous fraction materials may be disposed to a pond, a water body or a Publicly Owned Treatment Works (POTW).

In an embodiment, a second outlet 146 of the oil/water separator 140 is an organic fraction outlet 146. In an embodiment, the second outlet 146 outputs organic fraction materials, comprising the contaminants originally absorbed on the solid particles. In an embodiment, the second outlet 146 of the oil/water separator 140 may convey the organic fraction materials to an organic fraction device (not shown). In an embodiment, the organic fraction device may be selected from the group consisting of a drum, tank and a truck.

The oil/water separator 140 may be any suitable oil/water separator. For example, a suitable oil/water separator includes, but is not limited to, a hydrocyclone, a centrifuge, and an API separator or equivalent. In an embodiment, the oil/water separator 140 may be selected from the group consisting of hydrocylones, centrifuges, API separators or equivalent, and combinations thereof.

In an embodiment, the oil/water separator 140 may be a hydrocyclone.

A suitable oil/water separator 140 is available from GEA, SWECO, Schlumberger, and others.

An exemplary hydro cyclone 400 is depicted in FIG. 4. As shown in FIG. 4, the hydro cyclone 400 comprises an inlet 442, a first outlet 444 and a second outlet 446. In an embodiment, the hydro cyclone 400 may be the oil/water separator 440. In an embodiment, the second outlet of the first particle separator (not shown) is connected to the inlet 442 of the oil/water separator 440. In an embodiment, a first outlet 444 of the oil/water separator 440 is an aqueous fraction outlet. In an embodiment, the second outlet 446 of the oil/water separator 440 is an organic fraction outlet.

In an embodiment, the oil/water separator 140, 440 may be a centrifuge. Suitable centrifuges are described in U.S. Pat. Nos. 4,175,040, 4,959,158 and 5,591,340.

An exemplary centrifuge 1400 is depicted in FIG. 14. As shown in FIG. 14, the centrifuge 1400 comprises an inlet 1402, a distributor 1404, a disc stack 1406, a first solids fraction outlet 1408, a second aqueous fraction outlet 1410, and a second organic fraction outlet 1412, wherein the first solids fraction outlet 1408 comprises a sliding bottom bowl 1414 mounted on a spindle 1416. In an embodiment, the centrifuge 1400 may be the oil/water separator 140. In an embodiment, the second outlet of the first particle separator 134 is connected to the inlet of the oil/water separator 140, 1400, as shown in FIGS. 1A and 14.

In another embodiment, the second outlet of the first particle separator 134 is connected to an inlet of an optional second equalization tank 196; an outlet of the second equalization tank 196 is connected to an inlet of an optional tenth pump 198; and an outlet of the tenth pump 198 is connected to the inlet of the inlet of the oil/water separator 140, 1400, as shown in FIGS. 1A and 14.

To increase throughput, the oil/water separator 140 may comprise a plurality of oil/water separators connected in parallel. An exemplary plurality of oil/water separators 1100 connected in parallel is depicted in FIG. 11. In an embodiment, the plurality of oil/water separators 1100 connected in parallel 1140, 1140', 1140", etc. may be used as the oil/water separator 140.

To increase the efficiency of the separation of aqueous and organic fractions, the oil/water separator 140 may comprise a plurality of oil/water separators connected in series. An exemplary plurality of oil/water separators 1300 connected in series is depicted in FIG. 12. In an embodiment, the plurality of oil/water separators 1300 connected in series 1340, 1340', 1340", etc. may be used as the oil/water separator 140.

In an embodiment, the plurality of oil/water separators may be connected in series, parallel, and combinations thereof to optimize efficiency and throughput.

Optional Second Equalization Tank

In an embodiment, the system 100 comprises an optional second equalization tank 196, as shown in FIG. 1A.

In an embodiment, a second outlet of the first particle separator 134 is connected to an inlet of the second equalization tank 196; an outlet of the second equalization tank 196 is connected to an inlet of the oil/water separator 140.

In another embodiment, the second outlet of the first particle separator 134 is connected to an inlet of the second equalization tank 196; and an outlet of the second equalization tank 196 is connected to the inlet of an optional tenth pump 198; and an outlet of the tenth pump 198 is connected to the inlet of the oil/water separator 140.

The second equalization tank 196 may be any suitable chemical storage tank as discussed above with respect to the first equalization tank 188. Chemical storage tanks are well known in the art.

Alternatively, the second equalization tank 196 may be made of any suitable corrosion-resistant materials. The corrosion-resistant materials may be metals or plastics. Suitable corrosion-resistant metals include, but are not limited to, aluminum, aluminum-magnesium alloy, stainless steel, and combinations thereof; and suitable corrosion-resistant plastics include, but are not limited to, low density polyethylene, polycarbonate, polypropylene, polyvinylchloride, and combinations thereof. In an embodiment, the second equalization tank 196 may be selected from the group consisting of 99.5% pure aluminum, 304L stainless steel, and 316L stainless steel. In an embodiment, the second equalization tank 196 may be selected from the group consisting of low density polyethylene, polycarbonate, polypropylene, and polyvinylchloride.

Optional Tenth Pump

In an embodiment, the system 100 comprises an optional tenth pump 198, as shown in FIG. 1A. In an embodiment, an outlet of the second equalization tank 196 is connected to an inlet of the tenth pump 198; and an outlet of the tenth pump 198 is connected to an inlet of the oil/water separator 140.

The tenth pump 198 may be any suitable pump capable of pumping reacted oil/water solutions. Pumps are well known in the art.

Optional Second Particle Separator

If the contaminated sediment or soil contains sufficient quantities of sand, the sediment may be transported from the outlet of the slurry tank 108 to an inlet of an optional second particle separator 148. In an embodiment, the sediment or soil may be pumped at a constant flow rate and manifold pressure via the first pump 114. If the dredged sediment contains insufficient quantities of sand (i.e., low sand), the second particle separator 148 may be bypassed with the slurry of sediments or soils feeding directly to the first reaction vessel 118.

In an embodiment, the system 100 comprises an optional second particle separator 148, as shown in FIG. 1A. In an embodiment, an outlet of the slurry tank 108 is connected to an inlet of the second particle separator 148; and a second outlet of the second particle separator 148 is connected to the inlet of the first reaction vessel 118.

In another embodiment, the outlet of the slurry tank 108 is connected to an inlet of an optional first pump 114; a first outlet of the first pump 114 is connected to the first inlet of the reaction vessel 118; a second outlet 150 of the first pump 114 is connected to an inlet of the second particle separator 148.

In an embodiment, a first outlet 152 of the second particle separator 148 is a solids outlet 152. In an embodiment, the first outlet 152 of the second particle separator 148 outputs solids from the original slurry with a grain size greater than or equal to about 0.1 millimeters in diameter, preferably greater than or equal to about 0.08 millimeters in diameter, more preferably greater than or equal to about 0.07 millimeters in diameter, and most preferably greater than or equal to about 0.06 millimeters in diameter, and any range or value between about 0.05 and 0.1 millimeters in diameter. In an embodiment, the first outlet 152 of the second particle separator 148 outputs solids from the original slurry with a grain size consistent with sand materials (i.e., greater than or equal to about 0.06 millimeters in diameter). In an embodiment, the second particle separator 148 is oriented such that the solid materials are conveyed by gravity from the first outlet 152 of the second particle separator 148 to a solids storage device (not shown). In an embodiment, the solids storage device may be selected from the group consisting of a rolloff box, a truck, and a designated staging area.

The second particle separator 148 may be any suitable particle separator as discussed above with respect to the first particle separator 134. For example, a suitable particle separator includes, but is not limited to, a filtration device, a hydrocyclone and a centrifuge. In an embodiment, the second particle separator 148 may be selected from the group consisting of filtration devices, hydrocyclones, centrifuges, and combinations thereof.

In an embodiment, the second particle separator 148 may be a filtration device. Suitable filtration devices include but are not limited to, plate and frame filter presses. Suitable filtration devices are well-known in the art.

In an embodiment, the second particle separator 148 may be a hydrocyclone. The hydrocyclones should be designed with the proper geometrical relationship between the cyclone diameter, inlet area, vortex finder, apex orifice, and sufficient length to provide retention time, given the inlet pressure, so that, most preferably, solid particles greater than or equal to about 0.06 millimeters in diameter may be removed through the apex (first outlet) in the underflow, while the remaining smaller solid particles and liquids may be extracted through the vortex with the overflow (second outlet).

A suitable second particle separator 148 is available from Cavex Hydrocyclones, FLSmidth, GEA, and others.

An exemplary hydrocyclone 400 is depicted in FIG. 4. As shown in FIG. 4, the hydrocyclone 400 comprises an inlet 450, a first outlet 452 and a second outlet 454. In an embodiment, the hydrocyclone 400 may be the second particle separator 448. In an embodiment, the second outlet of the first pump (not shown) is connected to an inlet 450 of the second particle separator 448, and a second outlet 454 of the second particle separator 448 is connected to the inlet of the reaction vessel (not shown). In an embodiment, the first outlet 452 of the second particle separator 448 is a solids outlet.

In an embodiment, the second particle separator 148, 448 may be a centrifuge. Suitable centrifuges are described in U.S. Pat. Nos. 4,175,040, 4,959,158 and 5,591,340.

An exemplary centrifuge 1400 is depicted in FIG. 14. As shown in FIG. 14, the centrifuge 1400 comprises an inlet 1402, a distributor 1404, a disc stack 1406, a first solids fraction outlet 1408, a second aqueous fraction outlet 1410, and a second organic fraction outlet 1412, wherein the first solids fraction outlet 1408 comprises a sliding bottom bowl 1414 mounted on a spindle 1416. Centrifuge 1400 is shown for illustration purposes only. Although centrifuge 1400 separates the aqueous fraction outlet 1410 and the organic fraction outlet 1412, some types of centrifuges combine these aqueous and organic outlets as a combined liquids fraction outlet. In an embodiment, the centrifuge 1400 may be the second particle separator 148. In an embodiment, the outlet of the slurry tank 108 is connected to the inlet of second particle separator 148, 1400, as shown in FIGS. 1A and 14.

In another embodiment, the outlet of the slurry tank 108 is connected to an inlet of an optional first pump 114; a first outlet of the first pump 114 is connected to a first inlet of the first reaction vessel 118; a second outlet of the first pump 114 is connected to the inlet of the second particle separator 140, 1400, as shown in FIGS. 1A and 14.

To increase throughput, the second particle separator 148 may comprise a plurality of particle separators connected in parallel. An exemplary plurality of particle separators 1100 connected in parallel is depicted in FIG. 11. In an embodiment, the plurality of particle separators 1100 connected in parallel 1148, 1148', 1148", etc. may be used as the second particle separator 148.

To increase the efficiency, the second particle separator 148 may comprise a plurality of particle separators connected in series. An exemplary plurality of particle separators 1200 connected in series in FIG. 12. In an embodiment, the plurality of particle separators 1200 connected in series 1248, 1248', 1248", etc. may be used as the second particle separator 148.

In an embodiment, the plurality of particle separators may be connected in series, parallel, and combinations thereof to optimize efficiency and throughput.

In an embodiment, the second particle separator 148 may have a sample point or port at or near the first outlet 152 of the second particle separator 148 to test the solids for toxicity and/or other disposal criteria as may be required by federal and/or state law (e.g., RCRA). In an embodiment, the solids storage device may have a sample point or port. In an embodiment, if the solids fail to meet toxicity and/or other disposal criteria, the solids may be recycled to the first inlet of the first reaction vessel 118 for further treatment or disposed to an appropriate waste facility. In an embodiment, if the solids pass the toxicity and/or other disposal criteria, the solids may be transported offsite and sold for beneficial use.

Optional Computing Device

In an embodiment, the system 100 further comprises an optional computing device 800. The computing device 800 may be any suitable computing device. For example, a suitable computing device includes, but is not limited to, a computer, an engineered circuit board(s) and a programmable logic controller. Suitable computing devices are well known in the art.

Figure 8:
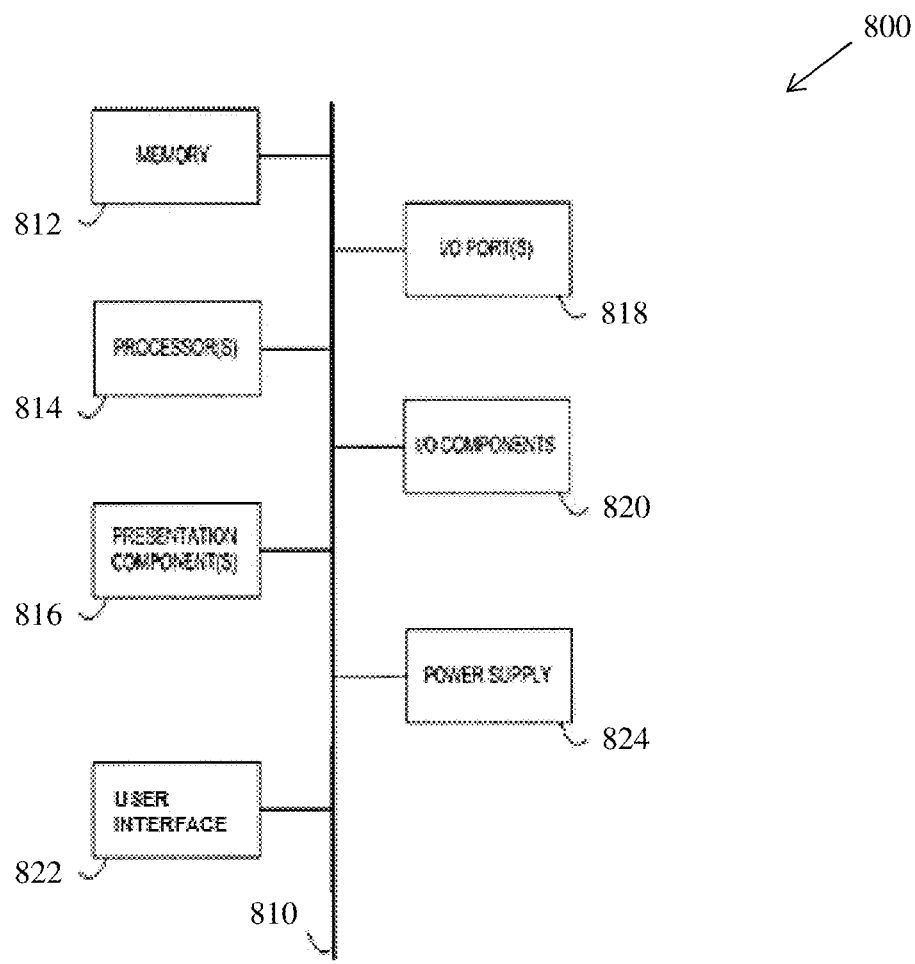
FIG. 8 illustrates a block diagram for a computing device for an exemplary system for treatment of contaminated sediments or soils using free radical chemical reaction and phase separation process according to an embodiment of the present invention.

With reference to FIG. 8, the computing device 800 of the system 100 may include a bus 810 that directly or indirectly couples the following devices: memory 812, one or more processors 814, one or more presentation components 816, one or more input/output (I/O) ports 818, I/O components 820, a user interface 822 and an illustrative power supply 824. In an embodiment, the sediment or soil inlet system 102 (e.g., shaker), the slurry tank 108, the first reaction vessel 118, the first particle separator 134, the optional second particle separator 148, the oil/water separator 140 and the optional first pump 114, the optional second pump 124, the optional third pump 130, the optional fourth pump 158, the optional fifth pump 178, the optional sixth pump 184, and the optional seventh pump 186, the optional eighth pump 190, the optional ninth pump 194 and the optional tenth pump 198 may couple directly or indirectly to a signal conditioning device. If the component's raw signal must be processed to provide a suitable signal for an I/O system, that component will couple indirectly the signal conditioning device.

The bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be fuzzy. For example, one may consider a presentation component such as a display device to be an I/O component. Additionally, many processors have memory. The inventors recognize that such is the nature of the art, and reiterate that the diagram of FIG. 8 is merely illustrative of an exemplary computing device that can be used in connection with one or more embodiments of the present invention. Further, a distinction is not made between such categories as "workstation," "server," "laptop," "mobile device," etc., as all are contemplated within the scope of FIG. 8 and reference to "computing device."

The computing device 800 of the system 100 typically includes a variety of computer-readable media. Computer-readable media can be any available media that can be accessed by the computing device 800 and includes both volatile and nonvolatile media, removable and non-removable media. By way of example, and not limitation, computer-readable media may comprise computer-storage media and communication media. The computer-storage media includes volatile and nonvolatile, removable and non-removable media implemented in any method or technology for storage of information such as computer-readable instructions, data structures, program modules or other data. Computer-storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 800.

The memory 812 includes computer-storage media in the form of volatile and/or nonvolatile memory. The memory 812 may be removable, non-removable, or a combination thereof. Suitable hardware devices include solid-state memory, hard drives, optical-disc drives, etc. The computing device 800 includes one or more processors 814 that read data from various entities such as the memory 812 or the I/O components 820.

The presentation component(s) 816 present data indications to a user or other device. In an embodiment, the computing device 800 outputs present data indications including, for example, agitation rate(s), flow rate(s), pressure(s), temperature(s), fluid level(s), equipment status, and/or or the like to a presentation component 816. Suitable presentation components 816 include a display device, speaker, printing component, vibrating component, and the like.

The user interface 822 allows the user to input/output information to/from the computing device 800. Suitable user interfaces 822 include keyboards, key pads, touch pads, graphical touch screens, and the like. In some embodiments, the user interface 822 may be combined with the presentation component 816, such as a display and a graphical touch screen. In some embodiments, the user interface 822 may be a portable hand-held device. The use of such devices is well known in the art.

The one or more I/O ports 818 allow the computing device 800 to be logically coupled to other devices including the sediment or soil inlet system 102 (e.g., shaker), the slurry tank 108, the first reaction vessel 118, the optional second reaction vessel 192, the first particle separator 134, the optional second particle separator 148, the oil/water separator 140 and the optional first pump 114, the optional second pump 124, the optional third pump 130, the optional pump 158, the optional fifth pump 178, the optional sixth pump 184, the optional seventh pump 186, the optional eighth pump 190, the optional ninth pump 194, the optional tenth pump 198, and other I/O components 820, some of which may be built in. Examples of other I/O components 820 include a printer, scanner, wireless device, and the like.

Figure 9:
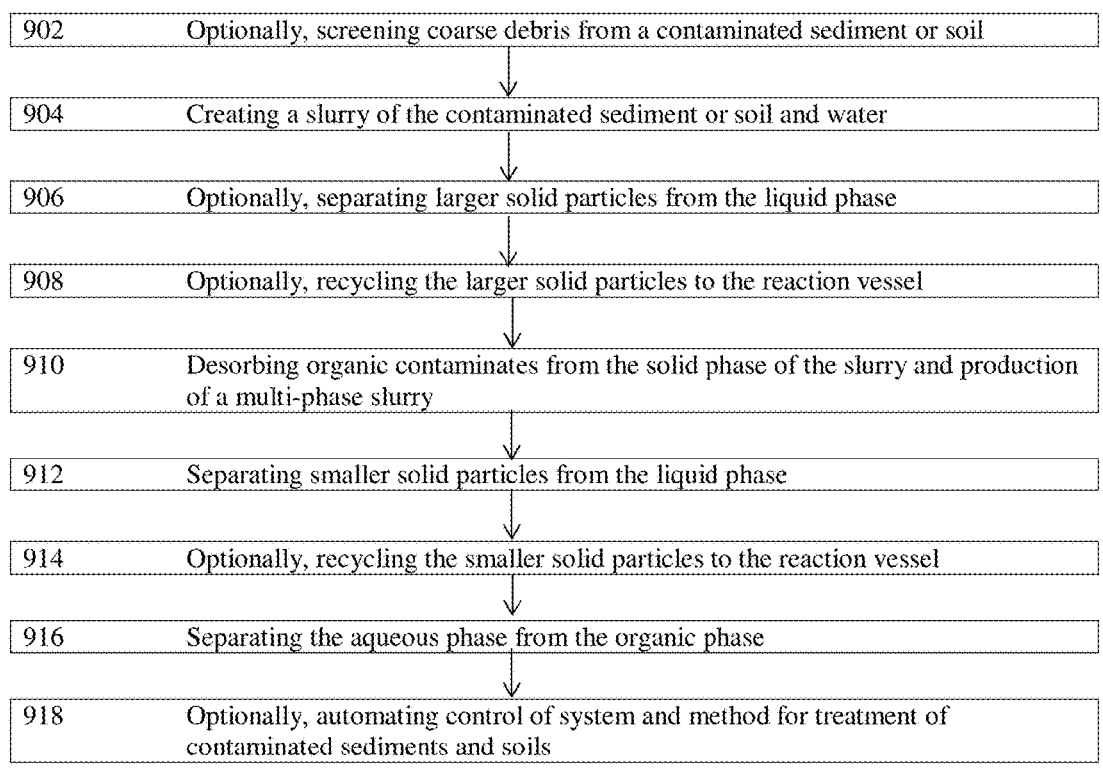
FIG. 9 illustrates a method for treatment of contaminated sediments or soils using free radical chemical reaction and phase separation processes according to an embodiment of the present invention.

Method of Treating Contaminated Sediments and Soils Using Free Radical Chemical Reaction and Phase Separation Processes A flow diagram for a method 900 of treating contaminated sediments or soils using an integrated free radical chemical reaction and phase separation processes is shown in FIG. 9. In an embodiment, the method 900 comprises the steps creating a slurry of contaminated sediment or soil and water using a slurry tank 904; desorbing organic contaminants from a solid fraction of the slurry using an oxidant agent in a reaction vessel and degrading the organic contaminants to produce a multi-phase slurry consisting of the solid, aqueous and organic fractions 910; separating smaller solid particles, most preferably, greater than or equal to about 0.002 millimeters in diameter from the reacted slurry using a first particle separator 912; and separating the aqueous fraction from the organic fraction using an oil/water separator 916, as shown in FIG. 9.

As discussed above, the oxidant agent may be selected from the group consisting of hydrogen peroxide, sodium persulfate, and combinations thereof. In an embodiment, the oxidant agent may be hydrogen peroxide. In an embodiment, the oxidant agent may be sodium persulfate. In an embodiment, the oxidant agent may be from about 1 mole to about 20 moles of oxidant agent per kilogram (and any range or value there between) of sediment or soil. In an embodiment, the oxidant agent may be hydrogen peroxide, and the concentration of the hydrogen peroxide may be from about 0.1% (about 0.03 M) to about 20% (about 6.0 M) (and any range or value there between).

In an embodiment, the method 900 further comprises a first step providing a system for treatment of contaminated sediments and soils as shown in FIG. 1A.

In an embodiment, an outlet of a sediment or soil inlet system 102 feeds into a first inlet of a slurry tank 108.

In an embodiment, an outlet of a water make-up tank 110 is connected to a second inlet of a slurry tank 108, as shown in FIG. 1A. In an embodiment, the outlet of the water make-up tank 110 is connected to a first inlet of the first line 112; and an outlet of the first line 112 is connected to the second inlet of the slurry tank 108. In another embodiment, the outlet of the water make-up tank 110 is connected to an inlet of an optional seventh pump 186; an outlet of the seventh pump 186 is connected to the inlet of the first line 112; and an outlet of the first line 112 is connected to the second inlet of the slurry tank 108.

In an embodiment, an outlet of an optional acid/base storage tank 174 is connected to the second inlet of the slurry storage tank 108. In an embodiment, the outlet of the acid/base storage tank 174 is connected to a first inlet of the first line 112; and an outlet of the first line 112 is connected to a second inlet of the slurry tank 108. In another embodiment, the outlet of the acid/base storage tank 174 is connected to an inlet of an optional sixth pump 184; an outlet of the sixth pump 184 is connected to a second inlet of the first line 112; and the outlet of the first line 112 is connected to the second inlet of the slurry tank 108.

As discussed above, the acid or base may be any suitable acid or base for adjusting the pH of the original slurry to the slurry tank 108. In an embodiment, the concentration and quantity of the acid is sufficient to adjust the pH of the original slurry to about 3 to about 6.8 (and any range or value there between). In an embodiment, the concentration and quantity of the base is sufficient to adjust the pH of the original slurry to about 8 to about 12 (and any range or value there between).

In an embodiment, an outlet of an optional catalyst storage tank 176 is connected to the third inlet of the first reaction vessel 118 and, optionally, to a third inlet of an optional second reaction vessel 192. In another embodiment, the outlet of the catalyst storage tank 176 is connected to an inlet of an optional fifth pump 178; and an outlet of the fifth pump 178 is connected to the third inlet of the first reaction vessel 118 and, optionally, to the third inlet of the second reaction vessel 192.

As discussed above, the catalyst may be any suitable catalyst capable of producing hydroxyl radical, superoxide radical anion and/or a hydroperoxide anion. Suitable catalysts include, but are not limited to, metal oxides, metal oxyhydroxides, metal salts, metal sulfides, and combinations thereof. In an embodiment, the catalyst may be selected from the group consisting of iron oxides, iron (III) perchlorate, amorphous and crystalline manganese oxides, amorphous and crystalline manganese oxyhydroxides, iron salts, iron sulfides, and combinations thereof. In an embodiment, the catalyst may be an iron sulfate. In an embodiment, the catalyst may be a manganese oxide. In an embodiment, the catalyst may be a manganese oxyhydroxide.

In an embodiment, a first outlet 138 of the first particle separator 134 is a solids fraction outlet 138. In an embodiment, the first outlet 138 of the first particle separator 134 outputs solids from the reacted slurry with a grain size of greater than or equal to about 0.01 millimeters in diameter, preferably greater than or equal to about 0.005 millimeters in diameter, more preferably greater than or equal to about 0.003 millimeters in diameter, and most preferably greater than or equal to about 0.002 millimeters in diameter, and any range or value between about 0.001 and about 0.01 millimeters in diameter. In an embodiment, the first outlet 138 of the first particle separator 134 outputs solids from the reacted slurry with a grain size consistent with fine sands, and/or silt and clay materials (i.e., greater than or equal to about 0.002 millimeters in diameter).

In an embodiment, the method 900 further comprises the optional step of recycling the smaller solid particles to the reaction vessel for further treatment 914 (when the smaller solid particles fail to meet toxicity and/or other disposal criteria as may be required by federal and/or state law (e.g., RCRA), as discussed above. In an embodiment, the smaller solid particles may be non-hazardous sediment or soil (when the smaller solid particles meet the toxicity and/or other disposal criteria).

In an embodiment, the method 900 further comprises the optional step of screening coarse debris from the contaminated sediment or soil using a screener upstream of the slurry tank 902, as discussed above.

In an embodiment, the method further comprises the optional step of separating larger solid particles, most preferably, greater than or equal to about 0.06 millimeters in diameter from the original slurry using a second particle separator upstream of the reaction vessel 906. In an embodiment, the first outlet 152 of the second particle separator 148 outputs solids from the original slurry with a grain size greater than or equal to about 0.1 millimeters in diameter, preferably greater than or equal to about 0.08 millimeters in diameter, more preferably greater than or equal to about 0.7 millimeters in diameter, and most preferably greater than or equal to about 0.06 millimeters in diameter, and any range or value between about 0.05 and 0.1 millimeters in diameter. In an embodiment, the first outlet 152 of the second particle separator 148 outputs solids from the original slurry with a grain size consistent with sand materials (i.e., greater than or equal to about 0.06 millimeters in diameter).

In an embodiment, the method 900 further comprises the optional step of recycling the larger solid particles from the original slurry to the first or second reaction vessel for further treatment 908 (when the larger solid particles fail to meet toxicity and/or other disposal criteria as may be required by federal and/or state law (e.g., RCRA). In an embodiment, the larger solid particles may be non-hazardous sand-like materials (when the larger solid particles meet the toxicity and/or other disposal criteria).

In an embodiment, the method 900 further comprises the optional step controlling a system for treatment of contaminated sediments and soils in a continuous or a semi-continuous batch mode using a computing device 918. In an embodiment, the computing device controls operating conditions for the slurry tank, the first reaction vessel, the optional second reaction vessel, the first particle separator, the optional second particle separator, the oil/water separator, the optional first pump, the optional second pump, the optional third pump, the optional fourth pump, the optional fifth pump, the optional sixth pump, the optional seventh pump, the optional eighth pump, the optional ninth pump and the optional tenth pump, and the valves.

Figure 10A:
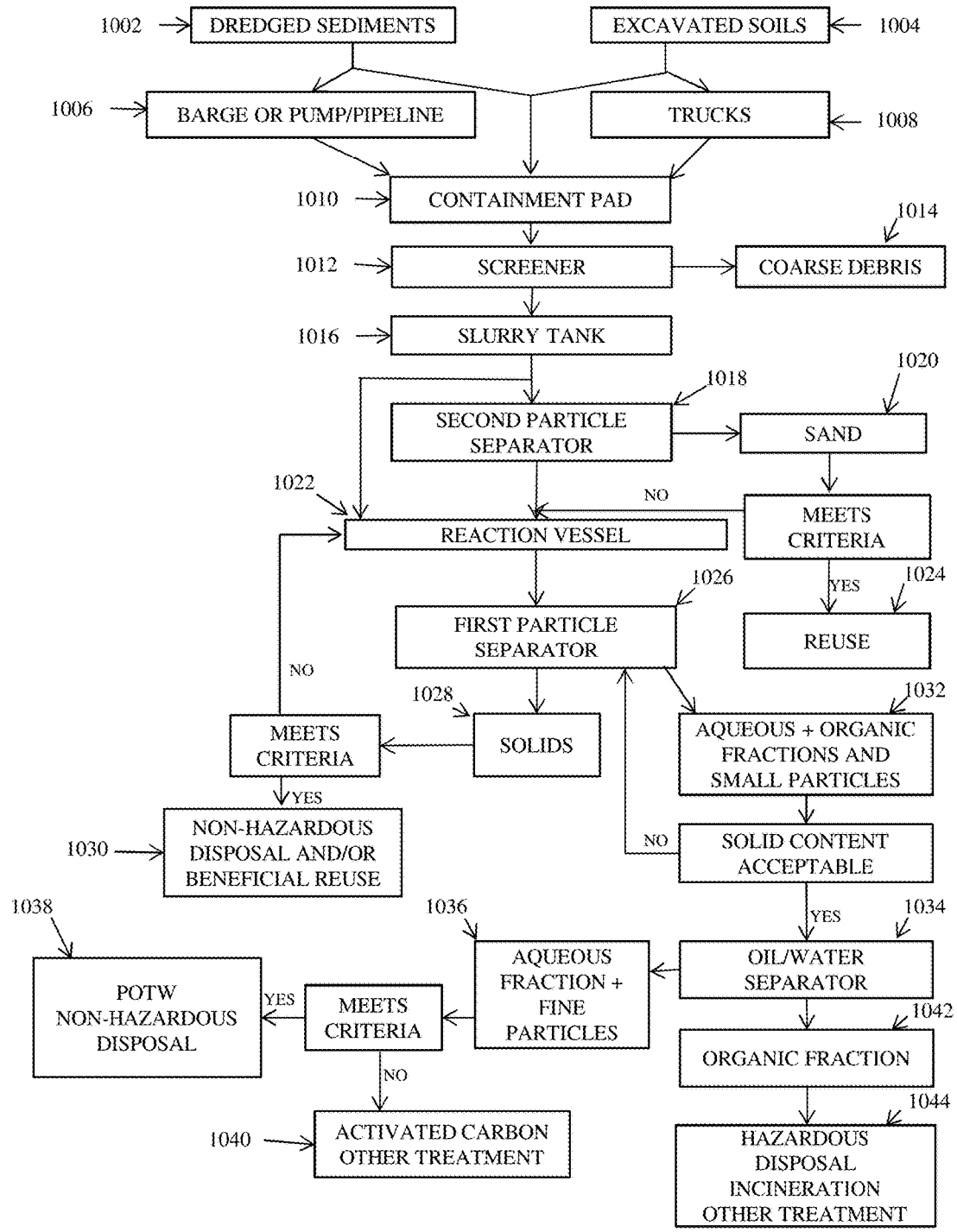
FIG. 10A illustrates an exemplary flow diagram for the method of FIG. 9.
Figure 10B:
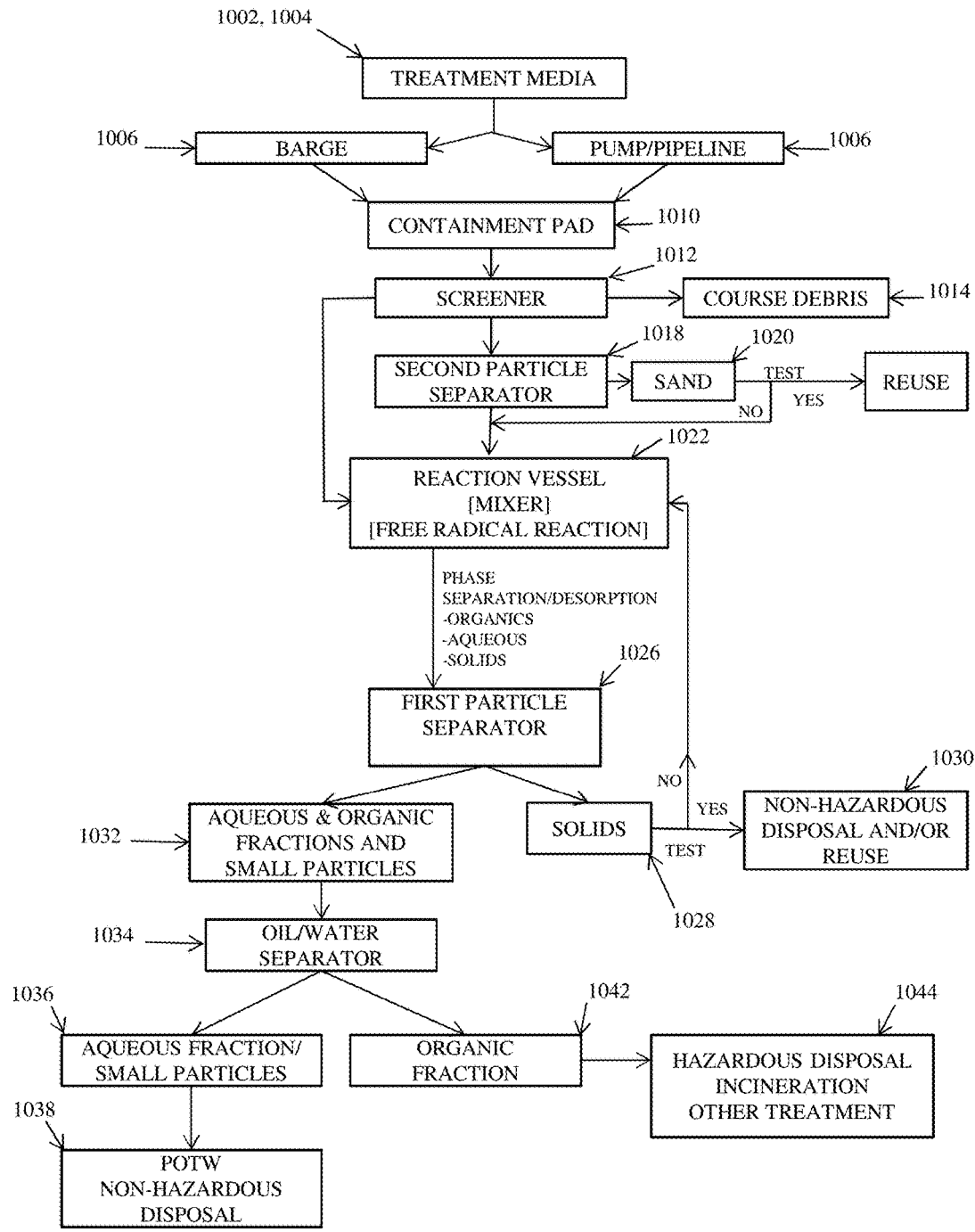
FIG. 10B illustrates another exemplary flow diagram for the method of FIG. 9.

Exemplary flow diagrams for the method 900 are shown in FIGS. 10A and 10B. In an embodiment, dredged sediments 1002 from a contaminated water body may be transported either directly or indirectly via barge or pipeline 1006 to a containment pad 1010. Similarly, excavated soils 1004 from a contaminated upland site may be transported either directly or indirectly via truck 1008 to the containment pad 1010. The dredged sediments 1002 or excavated soils 1004 may be delivered to a screener 1012 to retain coarse debris on the screener 1012, while permitting the remainder of the dredged sediment or excavated soil to feed a slurry tank 1016. The slurry tank 1016 should be sized to provide a continuous feed to an optional second particle separator (de-sanding unit) 1018 or a reaction vessel 1022.

If the sediment or soil contains significant quantities of sand, the slurry may be transferred to the second particle separator 1018 to separate the sand from the slurry. The sand 1020 may be stockpiled, sampled and tested to determine if the concentration of any hazardous constituents exceed regulatory thresholds for beneficial re-use or nonhazardous disposal. If the sand meets the applicable regulatory criteria, it may be transported off-site and sold for beneficial re-use 1024. Alternatively, the sand may be re-used on-site 1024. If the sand or any portion thereof fails to meet the criteria, it will be re-combined with the stream containing the smaller solid particles and liquids prior to processing through the reaction vessel 1022.

If the sand content of the dredged sediment or excavated soils is insignificant, the second particle separator 1018 may be bypassed and the de-sanding step omitted. In this case, all materials from the slurry tank 1016 will be transferred directly to the reaction vessel 1022.

In an embodiment, the reaction vessel 1022 agitates and mixes the sediment or soil and the oxidant agent, resulting in an exothermic, free radical chemical reaction that causes desorption of the organic contaminants from the solid particles in the sediments or soils, and to a greater or lesser extent, the degradation of the organic contaminants. This free radical chemical reaction results in a formation of a slurry of solids and water, and a separate organic fraction comprised primarily of the organic contaminants which have been desorbed from the solid particles (i.e., the desorption process).

Activation of the oxidant agent results in the formation of a number of free radical chemical species. Since the formation of the free radical chemical species is an exothermic reaction, large quantities of heat are also produced. The interaction of these free radicals with the organic hydrocarbon contaminants on the sediment or soil particles results in degradation of contaminants either by electrophilic substitution to aromatic compounds, addition to alkenes and/or hydrogen abstraction from saturated compounds (e.g., alkanes), as discussed above.

Although degradation of contaminants may be desirable, desorption of contaminants from the sediments or soils is more important to the overall treatment process. Thus, the free radical chemical reaction conditions should be optimized to achieve maximum desorption of contaminants from the sediment or soil particles, and not for degradation of contaminants.

In an embodiment, certain end-products may remain at the completion of desorption, degradation and separation stages of this invention, as follows:

(1) Sand Fraction. The initial removal of sand can result in a significant reduction in the quantity of material that requires treatment with the desorption/degradation/separation processes of this invention. The isolated Sand Fraction may be suitable for beneficial reuse.

(2) Solid Fraction. The Solid Fraction is comprised of the remaining solids (after sand removal if conducted) derived from the originally dredged sediments or excavated soils. This invention has the potential of desorbing, and/or degrading all organic contaminants from the Solid Fraction, rendering treated sediment/soil suitable for beneficial re-use or disposal as a non-hazardous material.

(3) Organic Fraction. The Organic Fraction is comprised of the organic contaminants that have been desorbed and separated from the Solid Fraction. The Organic Fraction represents a small percentage of the original volume and weight of the dredged sediments or excavated soils, thus minimizing the amount of materials requiring further treatment or disposal as hazardous waste. It should have little to no solid content. If desired, further treatment of the Organic Fraction may be completed using other standard treatment technologies such as incineration or solidification.

(4) Aqueous Fraction. Although the free radical chemical reaction is quite effective in degrading organic contaminants dissolved in the aqueous phase, low concentrations of these contaminants may remain in this fraction. If such concentrations exceed applicable regulatory criteria, then further treatment of the Aqueous Fraction may be completed using other standard water treatment technologies.

Following completion of the free radical chemical reaction, separation of the solid particles (i.e., Solid Fraction) from the other components constituting the slurry (i.e., Aqueous and Organic Fractions) may be accomplished using a first particle separator 1026.

Chemical analyses will be performed on the isolated Solid Fraction 1028 to determine the level of residual contamination. If the residual levels of contamination exceed any applicable regulatory criteria, then this Solid Fraction, or any portion thereof, can be recycled through the necessary processes of this invention. Otherwise, the solids are available for beneficial re-use or disposal or placement as non-hazardous material 1030.

If the solid content of the combined Aqueous and Organic Fractions 1032 is deemed to be sufficiently low, these combined fractions will be transferred to the oil/water separator 1034 to separate the Organic Fraction 1042 from the Aqueous Fraction 1036. It is envisioned that any small/fine particles will remain with the Aqueous Fraction. Chemical analysis of the Aqueous Fraction will be conducted to determine if any contaminant level exceeds any applicable regulatory criteria. If no criteria are exceeded, the Aqueous Fraction will be disposed of as a non-hazardous waste 1038 or released to the Publicly Owned Treatment Works (POTW). If any criteria are exceeded, the Aqueous Fraction may be treated with another appropriate remedial technology 1040. The Organic Fraction, which is comprised primarily of the organic contaminants desorbed from the sediment/soil particles, may be disposed of as hazardous waste or subject to treatment using another appropriate remedial technology 1044.

Due to the mobile nature of this technology, the system and method of the present invention will require minimal supporting infrastructure, unlike the large and costly infrastructure requirements associated with other treatment or dewatering technologies such as thermal desorption, plate and frame filter presses and Geotubes®.

The embodiments set forth herein are presented to best explain the present invention and its practical application and to thereby enable those skilled in the art to make and utilize the invention. However, those skilled in the art will recognize that the foregoing description has been presented for the purpose of illustration and example only. The description as set forth is not intended to be exhaustive or to limit the invention to the precise form disclosed. Many modifications and variations are possible in light of the above teaching without departing from the spirit and scope of the following claims. The invention is specifically intended to be as broad as the claims below and their equivalents.

Definitions

As used herein, the terms "a," "an," "the," and "said" mean one or more, unless the context dictates otherwise.

As used herein, the term "about" means the stated value plus or minus a margin of error or plus or minus 10% if no method of measurement is indicated.

As used herein, the term "or" means "and/or" unless explicitly indicated to refer to alternatives only or if the alternatives are mutually exclusive.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the phrase "consisting of" is a closed transition term used to transition from a subject recited before the term to one or more material elements recited after the term, where the material element or elements listed after the transition term are the only material elements that make up the subject.

As used herein, the term "simultaneously" means occurring at the same time or about the same time, including concurrently.

INCORPORATION BY REFERENCE

All patents and patent applications, articles, reports, and other documents cited herein are fully incorporated by reference to the extent they are not inconsistent with this invention.

What is claimed is:

1. A sediment treatment system for desorption of contaminates and treatment of contaminated sediments using free radical chemical reaction, the system comprising:
   a) a sediment inlet system;
   b) a slurry tank, wherein an outlet of the sediment inlet system feeds into an inlet of the slurry tank or a screen inlet of an optional screener, and, if the screener is present, a first outlet of the screener feeds into the inlet of the slurry tank;
   c) a water make-up tank, wherein an outlet of the water make-up tank is connected to the inlet of the slurry tank;
   d) a reaction vessel, wherein the outlet of the slurry tank is connected to an inlet of the first reaction vessel;
   e) a catalyst storage tank comprising a catalyst, wherein an outlet of the catalyst storage tank is connected to the inlet of the first reaction vessel;
   f) an oxidant agent storage tank comprising an oxidant agent, wherein an outlet of the oxidant agent storage tank is connected to the inlet of the first reaction vessel;
   g) an acid storage tank comprising an acid, wherein an outlet of the acid storage tank is connected to the inlet of the slurry tank; and
   h) a base storage tank comprising a base, wherein an outlet of the base storage tank is connected to the inlet of the slurry tank.

2. The system of claim 1, wherein the oxidant agent is selected from the group consisting of hydrogen peroxide, sodium persulfate, and combinations thereof.

3. The system of claim 1, wherein the acid is selected from the group consisting of carboxylic acids, mineral acids, organic acids, and combinations thereof.

4. The system of claim 1, wherein the base is selected from the group consisting of mineral bases, organic bases, and combinations thereof.

5. The system of claim 1, wherein the catalyst is selected from the group consisting of a metal oxide, a metal oxyhydroxide, a metal salt, a metal sulfate or a metal sulfide.

6. The system of claim 5, wherein the catalyst is selected from the group consisting of iron oxides, iron (III) perchlorate, amorphous and crystalline manganese oxides, amorphous and crystalline manganese oxyhydroxides, iron salts, iron sulfates, iron sulfides, and combinations thereof.

7. The system of claim 1, wherein the sediment and/or soil inlet system comprises:
   a) a screener comprising:
      i. a screen inlet;
      ii. a shaker, wherein the shaker shakes the screen inlet;
      iii. a first outlet of the screener; and
      iv. a second outlet of the screener, wherein the first outlet of the screener feeds into the inlet of the slurry tank and wherein the second outlet of the screener is a coarse debris outlet.

8. The system of claim 1, wherein the sediment inlet system comprises:
   a) a hydraulic dredge, wherein an outlet to the hydraulic dredge is connected to a screen inlet of a screener or the inlet of the slurry tank.

9. The system of claim 1, wherein the sediment inlet system comprises:
   a) a mechanical dredge; and
   b) a conveyor, wherein an outlet of the mechanical dredge supplies an inlet of the conveyor and wherein an outlet of the conveyor feeds into a screen inlet of a screener or the inlet of the slurry tank.

10. The system of claim 1, wherein the sediment inlet system comprises:
    a) an excavator; and
    b) a screener comprising:
       i. a screen inlet,
       ii. a first outlet of the screener; and
       iii. a second outlet of the screener, wherein an outlet of the excavator feeds into the screen inlet of the screener, wherein the first outlet of the screener feeds into the inlet of the slurry tank and wherein the second outlet of the screener is a coarse debris outlet; and
       iv. a shaker, wherein the shaker shakes the screen inlet.

11. The system of claim 1, further comprising f) a first particle separator, wherein an outlet of the first reaction vessel is connected to an inlet of the first particle separator, wherein a first outlet of the first particle separator is a solids outlet.

12. The system of claim 11 further comprising a second particle separator, wherein the outlet of the slurry tank is connected to an inlet of the second particle separator, wherein a first outlet of the second particle separator is a solids outlet, and wherein a second outlet of the second particle separator is connected to the inlet of the first reaction vessel.

13. The system of claim 11, wherein the first particle separator is selected from the group consisting of filtration devices, hydrocyclones, centrifuges, and combinations thereof.

14. The system of claim 11, wherein the first particle separator or a solids storage device has a sample port near the first outlet of the first particle separator to test solid materials for toxicity and/or other disposal criteria.

15. The system of claim 11, further comprising a first equalization tank, wherein the outlet of the first reaction vessel is connected to an inlet of the first equalization tank and wherein an outlet of the first equalization tank is connected to the inlet of the first particle separator.

16. The system of claim 15, further comprising a second equalization tank, wherein the second outlet of the first particle separator is connected to an inlet of the second equalization tank and wherein an outlet of the second equalization tank is connected to the inlet of the oil/water separator.

17. The system of claim 11, further comprising g) an oil/water separator, wherein a second outlet of the first particle separator is connected to an inlet of the oil/water separator, wherein a first outlet of the oil/water separator is an aqueous fraction outlet and wherein a second outlet of the oil/water separator is an organic fraction outlet.

18. The system of claim 17, wherein the oil/water separator is selected from the group consisting of filtration devices, hydrocyclones, centrifuges, API oil/water separators, and combinations thereof.

19. The system of claim 17, wherein the first particle separator or the oil/water separator is a hydrocyclone.

20. The system of claim 17, wherein the first particle separator or the oil/water separator is a centrifuge.

21. The system of claim 17, wherein the first particle separator comprises a plurality of particle separators connected in parallel, wherein the second particle separator comprises a plurality of particle separators connected in parallel or wherein the oil/water separator comprises a plurality of oil/water separators connected in parallel.

22. The system of claim 17, wherein the first particle separator comprises a plurality of particle separators connected in series, wherein the second particle separator comprises a plurality of particle separators connected in series or wherein the oil/water separator comprises a plurality of oil/water separators connected in series.

23. The system of claim 17, wherein the oil/water separator or an aqueous storage device has a sample port near the first outlet of the oil/water separator to test aqueous fraction materials for toxicity and/or other disposal criteria.

24. The system of claim 17, wherein the oil/water separator is oriented such that an aqueous fraction material is conveyed by gravity from the aqueous fraction outlet to an aqueous storage device.

25. A sediment treatment method for desorption of contaminates and treatment of contaminated sediments using free radical chemical reaction comprising the steps of:
    a) providing the system of claim 1;
    b) creating and mixing a slurry of sediment and water using the slurry tank and mixing the slurry with the acid and/or the base using the slurry tank; and
    c) desorbing organic contaminants from a solid fraction of the slurry by mixing the slurry with the catalyst and the oxidant agent in the first reaction vessel and degrading the organic contaminants to produce a multi-phase slurry.

26. The method of claim 25, wherein the oxidant agent is selected from the group consisting of hydrogen peroxide, sodium persulfate, and combinations thereof.

27. The method of claim 26, wherein the oxidant agent is hydrogen peroxide.

28. The method of claim 26, wherein the oxidant agent is sodium persulfate.

29. The method of claim 25, wherein the oxidant agent concentration is from about 1 mole to about 20 moles per kilogram of sediment.

30. The method of claim 25, wherein the oxidant agent concentration is from about 0.1% to about 20%.

31. The method of claim 25, wherein the acid is selected from the group consisting of carboxylic acids, mineral acids, organic acids, and combinations thereof.

32. The method of claim 25, wherein the base is selected from the group consisting of mineral bases, organic bases, and combinations thereof.

33. The method of claim 25, wherein the slurry has a pH of about 3.0 to about 6.8.

34. The method of claim 25, wherein the slurry has a pH of about 8 to about 12.

35. The method of claim 25 further comprising the step of recycling smaller solid particles to the first reaction vessel or a second reaction vessel for further treatment.

36. The method of claim 35, further comprising the step of controlling the system in a continuous or a semi-continuous batch mode using a computing device.

37. The method of claim 25, wherein smaller solid particles are nonhazardous sediment.

38. The method of claim 25, further comprising the step of screening coarse debris from the contaminated sediment using a screener upstream of the slurry tank.

39. A sediment treatment method for desorption of contaminates and treatment of contaminated sediments using free radical chemical reaction comprising the steps of:
   a) providing the system of claim 5;
   b) creating and mixing a slurry of sediment and water using the slurry tank and mixing the slurry with the acid and/or the base using the slurry tank; and
   c) desorbing organic contaminants from a solid fraction of the slurry by mixing the slurry with the catalyst and the oxidant agent in the first reaction vessel and degrading the organic contaminants to produce a multi-phase slurry.

40. The method of claim 39, wherein the oxidant agent and the catalyst form a hydroxyl radical, a superoxide radical anion and/or a hydroperoxide anion.

41. The method of claim 39, wherein the catalyst is a metal oxide, a metal oxyhydroxide, a metal salt, a metal sulfate or a metal sulfide.

42. The method of claim 39, wherein the catalyst is selected from the group consisting of iron oxides, iron (III) perchlorate, amorphous and crystalline manganese oxides, amorphous and crystalline manganese oxyhydroxides, iron salts, iron sulfates, iron sulfides, and combinations thereof.

43. The method of claim 42, wherein the catalyst is an iron oxide.

44. The method of claim 42, wherein the catalyst is a manganese oxide.

45. The method of claim 42, wherein the catalyst is a manganese oxyhydroxide.

46. The method of claim 42, wherein the catalyst is an iron sulfate.

47. A sediment treatment method for desorption of contaminates and treatment of contaminated sediments using free radical chemical reaction comprising the steps of:
   a) providing the system of claim 12;
   b) comprises creating and mixing the slurry of sediment and water using the slurry tank and mixing the slurry with the acid and/or base using the slurry tank, and separating larger solid particles from the slurry using the second particle separator upstream of the first reaction; and
   c) desorbing organic contaminants from a solid fraction of the slurry by mixing the slurry with the catalyst and the oxidant agent in the first reaction vessel and degrading the organic contaminants to produce a multi-phase slurry.

48. The method of claim 47, further comprising the step of recycling the larger solid particles from the slurry to the first reaction vessel or a second reaction vessel for further treatment.

49. The method of claim 47, wherein the larger solid particles are nonhazardous solids.

50. The method of claim 48, wherein the system is controlled in a continuous or a semi-continuous batch mode using a computing device.

51. A sediment treatment method for desorption of contaminates and treatment of contaminated sediments using free radical chemical reaction comprising the steps of:
   a) providing the system of claim 7;
   b) creating and mixing a slurry of sediment and water using the slurry tank and mixing the slurry with the acid and/or the base using the slurry tank;
   c) desorbing organic contaminants from a solid fraction of the slurry by mixing the slurry with the catalyst and the oxidant agent in the first reaction vessel and degrading the organic contaminants to produce a multi-phase slurry; and
   d) separating smaller solid particles from the liquid fraction using the first equalization tank upstream of the first particle separator.

52. A sediment treatment method for desorption of contaminates and treatment of contaminated sediments using free radical chemical reaction comprising the steps of:
   a) providing the system of claim 16;
   b) creating and mixing a slurry of sediment and water using the slurry tank and mixing the slurry with the acid and/or the base using the slurry tank; and
   c) desorbing organic contaminants from a solid fraction of the slurry by mixing the slurry with the catalyst and the oxidant agent in the first reaction vessel and degrading the organic contaminants to produce a multi-phase slurry;
   d) separating smaller solid particles from the liquid fraction using the first equalization tank upstream of the first particle separator; and
   e) separating the aqueous fraction from the organic fraction using the second equalization tank upstream of the oil/water separator.

53. A sediment treatment method for desorption of contaminates and treatment of contaminated sediments using free radical chemical reaction comprising the steps of:
   a) providing the system of claim 11;
   b) creating and mixing a slurry of sediment and water using the slurry tank and mixing the slurry with the acid and/or the base using the slurry tank;
   c) desorbing organic contaminants from a solid fraction of the slurry by mixing the slurry with the catalyst and the oxidant agent in the first reaction vessel and degrading the organic contaminants to produce a multi-phase slurry; and
   d) separating smaller solid particles from the liquid fraction using the first particle separator.

54. A sediment treatment method for desorption of contaminates and treatment of contaminated sediments using free radical chemical reaction comprising the steps of:
   a) providing the system of claim 17;
   b) creating and mixing a slurry of sediment and water using the slurry tank and mixing the slurry with the acid and/or the base using the slurry tank;
   c) desorbing organic contaminants from a solid fraction of the slurry by mixing the slurry with the catalyst and the oxidant agent in the first reaction vessel and degrading the organic contaminants to produce a multi-phase slurry;
d) separating smaller solid particles from the liquid fraction using the first particle separator, and
e) separating the aqueous fraction from the organic fraction using the oil/water separator.

* * * * *